US008406141B1

(12) United States Patent (10) Patent No.: US 8,406,141 B1
Couturier et al. (45) Date of Patent: Mar. 26, 2013

(54) NETWORK SEARCH METHODS AND SYSTEMS

(75) Inventors: Russell L. Couturier, Marlborough, MA (US); Patrick V. Johnstone, Marlborough, MA (US); John H. Ricketson, Marlborough, MA (US)

(73) Assignee: Cybertap, LLC, Englewood, CO (US)

( * ) Notice: Subject to any disclaimer, the term of this patent is extended or adjusted under 35 U.S.C. 154(b) by 469 days.

(21) Appl. No.: 12/778,101

(22) Filed: May 11, 2010

Related U.S. Application Data

(63) Continuation-in-part of application No. 12/692,805, filed on Jan. 25, 2010, now abandoned, which is a continuation of application No. 12/046,966, filed on Mar. 12, 2008, now Pat. No. 7,653,006.

(60) Provisional application No. 60/894,417, filed on Mar. 12, 2007, provisional application No. 61/177,568, filed on May 12, 2009, provisional application No. 61/318,041, filed on Mar. 26, 2010.

(51) Int. Cl.
 *H04L 12/26* (2006.01)
(52) U.S. Cl. ....................................... 370/241
(58) Field of Classification Search ........................ None
See application file for complete search history.

(56) References Cited

U.S. PATENT DOCUMENTS

| 2003/0130987 | A1* | 7/2003 | Edlund et al. ...................... 707/3 |
| 2007/0233643 | A1* | 10/2007 | Kang et al. ......................... 707/2 |
| 2008/0159146 | A1* | 7/2008 | Claudatos et al. ............ 370/235 |
| 2008/0162135 | A1* | 7/2008 | Claudatos et al. ............ 704/243 |
| 2012/0173710 | A1* | 7/2012 | Rodriguez ..................... 709/224 |
| 2012/0254366 | A1* | 10/2012 | Kusterer et al. ............... 709/219 |

* cited by examiner

*Primary Examiner* — Otis L Thompson, Jr.
(74) *Attorney, Agent, or Firm* — Jacobs & Kim LLP; David Jacobs

(57) ABSTRACT

Methods, systems, devices and computer program code products for enabling searches of digital communications network traffic to identify information transmitted by, received by, or exchanged with a given human or non-human entity, include, or include elements for, translating Pcap files or streams of IP network packets obtained from the network into a scalable form suitable for query by search engine functionality, thereby to enable scalable, text-based search of network information contained in the Pcap files, and providing scalable search engine functionality to enable a user to execute text-based searches on textual or human relationship-identifying information derived from the Pcap files or streams of IP network packets, thereby to identify information transmitted by, received by, or exchanged with the given human or non-human entity, wherein the scalable search engine functionality is capable of scaling to search massive quantities of Pcap file or IP network packet data.

37 Claims, 33 Drawing Sheets

240

```xml
<?xml version="1.0" encoding="utf-8"?>
<DataObjects xmlns="http://tempuri.org/CompanyXYZDataObject.xsd">
<DataObject>
    <TargetIdentifier><![CDATA[case1]]></TargetIdentifier>
    <InputFileIdentifiers>
        <InputFileIdentifier>comcast.pcap</InputFileIdentifier>
    </InputFileIdentifiers>
    <EventLevel><![CDATA[1]]></EventLevel>
    <Identifier><![CDATA[comcast.pcap-206]]></Identifier>
    <HasContent><![CDATA[false]]></HasContent>
    <StartTime><![CDATA[2010-03-18T19:09:02.000Z]]></StartTime>
    <Duration><![CDATA[PT0S]]></Duration>
    <OriginationStartTime><![CDATA[2009-11-30T17:52:40.634Z]]></OriginationStartTime>
    <OriginationDuration><![CDATA[PT0S]]></OriginationDuration>
    <NetworkProtocol><![CDATA[http]]></NetworkProtocol>
    <TrafficType><![CDATA[email]]></TrafficType>
    <FormatType><![CDATA[url_based]]></FormatType>
    <Direction><![CDATA[unknown]]></Direction>
    <Metadata>
        <SourceIPAddress><![CDATA[76.96.58.136]]></SourceIPAddress>
        <DestinationIPAddress><![CDATA[192.168.10.104]]></DestinationIPAddress>
        <SourceMACAddress><![CDATA[00:1e:e5:73:5b:5a]]></SourceMACAddress>
        <DestinationMACAddress><![CDATA[00:17:08.49:e7:f1]]></DestinationMACAddress>
        <From><![CDATA[kdadey@gmail.com]]></From>
        <Subject><![CDATA[comcast.cpp]]></Subject>
        <MIME><![CDATA[text/plain]]></MIME>
        <URL><![CDATA[http://sz0080.wc.mail.comcast.net/service/soap/SearchRequest]]></URL>
    </Metadata>
</DataObject>
</DataObjects>
```

NETWORK SEARCH METHODS AND SYSTEMS

CROSS-REFERENCE TO RELATED APPLICATIONS

Incorporation by Reference

This application is a continuation-in-part of, and claims the priority of, U.S. patent application Ser. No. 12/692,805 filed Jan. 25, 2010. U.S. patent application Ser. No. 12/692,805 is a continuation of U.S. patent application Ser. No. 12/046,966 filed Mar. 12, 2008, and issued as U.S. Pat. No. 7,653,006 on Jan. 26, 2010. U.S. patent application Ser. No. 12/046,966 claims the priority benefit of U.S. Provisional Pat. App. 60/894,417 filed Mar. 12, 2007.

In addition, this application claims the priority benefit of U.S. Provisional Pat. App. 61/177,568 filed May 12, 2009; and U.S. Provisional Pat. App. 61/318,041 filed Mar. 26, 2010.

This application incorporates by reference each of the above as if set forth in its entirety herein.

COMPUTER PROGRAM LISTING APPENDIX

A Computer Program Listing Appendix has been submitted electronically using the United States Patent Office EFS-Web system. The Computer Program Listing Appendix was submitted in a file entitled DJV_CONV.txt, created on May 9, 2010, and consisting of 56,429 bytes of data. The Computer Program Listing Appendix is incorporated by reference in its entirety.

FIELD OF THE INVENTION

The present invention relates generally to methods, systems, devices and software products for computer network administration and, more particularly, to methods, systems, devices and software products operable to provide full search access to repositories of captured network traffic.

BACKGROUND OF THE INVENTION

Corporations, military, and government organizations are creating massive repositories of network traffic in various forms, including Pcap (packet capture) files, mail archives, IM archives, and line-rate packet captures. These repositories are used for security forensics, lawful intercept, business intelligence, and legal artifacts. They can be very large and contain both networking attributes and content information. Networking attributes are protocol details that describe the genetic nature (network footprints) of the sessions. The content can include actual conversations, files, voice dialogs, pictures, and any other human interpretable information contained in the sessions. Furthermore, there are typically social relationships between many or all of the sessions in the repository. These include, for example, who is talking to who, common web servers, common mail servers, common information, and conversation threads.

Much of the information shared between two parties is not stored on disk. For example, web based conversations, phone calls, cut and paste transfers, social networking tasks, and any web based application that is not logged locally.

It would thus be desirable to provide methods, systems and computer program code (software) products that enable full search access to all of these operations, including any data that is stored locally or remotely.

Aspects, examples, and practices of the invention will next be described in greater detail in the following Detailed Description of the Invention, in conjunction with the attached drawing figures.

SUMMARY OF THE INVENTION

The present invention provides systems, devices, methods and computer program code (software) products for, among other aspects and possible applications, enabling searches of digital communications network traffic to identify information transmitted by, received by, or exchanged with a given human or non-human entity; and enabling searches of digital communications network traffic to identify selected human users of the network, and to identify social networks of human users of the network;

Systems, devices, methods and computer program code (software) products in accordance with the invention are suitable for implementation or execution in, or in conjunction with, a computer system including a computer for processing information in accordance with the invention, and in, or in conjunction with, any of a wide range of commercially available computer hardware and software environments, such as personal computers (PCs) or workstations utilizing microprocessor hardware commercially available from Intel Corporation of Santa Clara, Calif., and operating systems such as Windows, commercially available from Microsoft Corporation of Redmond, Wash., as well as networks of computers and communications devices such as the Internet.

One aspect of the present invention relates to methods, systems and computer program code (software) products executable in a digital processor, wherein the methods, systems and computer program code (software) products include, or include elements for, enabling searches of digital communications network traffic to identify information transmitted by, received by, or exchanged with a given human or non-human entity, including (1) translating Pcap files or streams of IP network packets obtained from the network into a scalable form suitable for query by search engine functionality, thereby to enable scalable, text-based search of network information contained in the Pcap files, and (2) providing scalable search engine functionality to enable a user to execute text-based searches on textual or human relationship-identifying information derived from the Pcap files or streams of IP network packets, thereby to identify information transmitted by, received by, or exchanged with the given human or non-human entity, wherein the scalable search engine functionality is capable of scaling to search massive quantities of Pcap file or IP network packet data.

Another aspect of the invention relates to methods, systems and computer program code (software) products executable in a digital processor, wherein the methods, systems and computer program code (software) products include, or include elements for, enabling searches of digital communications network traffic to identify selected human users of the network, and to identify social networks of human users of the network, including:

(1) translating Pcap files or streams of IP network packets obtained from the network into a scalable form suitable for query by search engine functionality, thereby to enable scalable, text-based search of network information contained in the Pcap files or streams of IP network packets, the Pcap files or streams of IP network packets comprising metadata extracted from network traffic, wherein the metadata comprise elements identifying selected human users of the network, (2) providing scalable search engine functionality to enable a user to execute text-based searches on textual or human relationship-identifying information derived from the Pcap files or streams of IP network packets, (3) correlating, via the scalable search engine functionality, selected metadata to identify human users of the network, wherein the metadata comprises identifying elements that enable the search engine functionality to correlate information that identifies human users of the network, and (4) identifying, via the scalable search engine functionality, relationships between human users of the network, or social networks or portions of social networks, by correlating the identifies of first human users of the network and second human users that communicate with the first human users of the network, wherein the identifying enables rapid recall or identification of relationships between human users of the network, or social networks or portions of social networks, from massive quantities of Pcap file or IP network packet data, thereby to identify human users of the network; and identify social networks of human users of the network.

Yet another aspect of the invention relates to methods, systems and computer program code (software) products executable in a digital processor, wherein the methods, systems and computer program code (software) products include, or include elements for, enabling searches of digital communications network traffic to identify information transmitted by, received by, or exchanged with a given human or non-human entity, the methods including translating Pcap files or streams of IP network packets obtained from the network into rich XML (extensible markup language) documents or rich XML document-like entities, and compiling the rich XML documents or document-like entities into at least one scalable, searchable, document-oriented database, such that packet-level IP network session data are converted into a scalable form suitable for text-based query by search engine functionality, thereby to enable scalable, text-based search and retrieval of network information, and providing scalable search engine functionality to enable a user to execute text-based searches on textual or human relationship-identifying information in the searchable database, thereby to identify information transmitted by, received by, or exchanged with the given human or non-human entity.

In one aspect of the invention, at least a subset of searches are enabled via content-based text indexing.

In another practice of the invention, the Pcap files comprise IP session messages, transactions and protocol sequences.

In yet another aspect of the invention, the rich XML documents or rich XML document-like entities comprise metadata extracted from network traffic, wherein the metadata comprise any of session time and duration, email server type, user agent web browser identification, protocol type, username, password, and email subject line.

One aspect of the invention further includes utilizing a Pcap decompiler that creates indexes for network session attributes, message contents and object contents, and generating a Pcap decompiler output comprising an XML file representative of sessions, messages, object attachments and indexes, and further comprises utilizing selected tap points in the network to capture information, wherein the tap points can include any of communications switches, servers, client devices, VOIP devices.

In one practice of the invention the search engine functionality enables creation of metatags to be indexed in association with corresponding rich XML documents or rich XML document-like entities, the metatags incorporating session-specific network information, thereby to enable searching of the database based on network information.

In another aspect of the invention both network information and session content are indexed in the database, to enable searching based upon any or both of network information and session content.

One aspect of the invention further includes executing metadata searches of network information.

Another aspect of the invention includes executing full text searches of session content.

One aspect of the invention includes identifying a subset of network metadata that enables identification of activity of at least one human user of the digital communications network.

In another aspect of the invention, the subset of network metadata comprises any of email address, IP address, MAC address, name, postal address, telephone numbers, VOIP numbers, IM chat "handles", social network site identifiers, website domain names, and Personally Identifiable Information (PII), wherein the PII comprises any of social security numbers or credit card numbers.

In yet another aspect of the invention, the subset of network metadata is utilized for identity resolution, wherein identity resolution comprises identifying specific, individual human users of the network.

Another aspect of the invention includes constructing a database of social network links, utilizing the subset of network metadata. The database of social network links can include identification of contacts, which comprise human individuals or other entities with whom a human or non-human entity under investigation communicates, and contacts of contacts, which comprise human or non-human entities with whom the contacts of the entity under investigation communicate. The database of social network links can be utilized to identify links between network users even if the network users utilize different identifiers to communicate with different contacts.

In one practice of the invention the search engine functionality is used to identify associations between data elements in the database.

In one aspect of the invention network documents can be retrieved by searching based on selected keywords, and wherein the keywords can be used to search across any of text content and meta-data terms.

In another aspect of the invention the rich XML retains forensic details of an original capture, and wherein data represented by original Pcap files can be recreated from the XML on demand.

In yet another aspect of the invention the database is configured for searching by either or both of network data and non-network data. Non-network data can include any of network security device log files, external data-at-rest database files, data recovered from data storage devices or mobile telephones, data electronically compiled from paper documents, and open source information.

In one practice of the invention the rich XML documents or rich XML document-like entities, and the meta-data, are further utilized to generate a graphical display of social network diagrams.

Another aspect of the invention includes deriving textual information, audio/visual media, or other information from any of email and document attachments, instant messaging transcripts, websites viewed, social networking sites and related transcripts, audio and VOIP calls, relational database accesses, and remote access by users to CPUs and file servers. The invention can also include correlating human identities, inter-human relationships, conversations and network metadata, computers, physical locations, electronic locations, internet IDs, cellular IDs, and computers, in response to keyword searches by a human user of the search engine function.

The invention can also include decompiling at least one stream of digital network traffic data, the digital stream decompilation being applicable to any of POP3, SMTP, or IMAP streams, web mail, social networks, and blog streams, VOIP, HTTP, and CIFS streams, FTP, Oracle and DNS streams, instant messaging and email streams.

The Pcap files utilized in one aspect of the invention can include (a) a representation of network traffic for a selected network interface card (NIC) for a selected time period, and (b) session protocol information comprising network attributes.

Another aspect of the invention can include searching of the database based on any of network content, network traffic genetics, metadata or attributes, wherein network traffic genetics comprises any of protocol headers, MAC, IP and port addresses, and attachment metadata.

One aspect of the invention includes correlating selected search results with one or more social networks of network users. In accordance with one aspect of the invention, social networks are identified by evaluating one or more social network indicators, comprising any or email threads, IM chat "buddies", common web servers visited, common VOIP calls, common IP addresses, common FTP sites, or social network sharing.

Another aspect of the invention includes providing a user interface, wherein the user interface comprises a Web-based interface that enables searching based on any of content or network attributes.

In one practice of the invention, the database and search engine functionality utilize a secure hosted environment wherein any of archives and Pcap files are imported via encrypted transport protocols. The database and search engine functionality in one aspect of the invention are implemented in a networking and storage device located in a user's selected facility.

In another practice of the invention, the database and search engine functionality are implemented using a plurality of traffic-inspection modules that decompose network traffic.

The invention can also include identifying and providing access to a set of documents associated with a network session.

These and other aspects, examples, embodiments and practices of the invention, whether in the form of methods, devices, systems or computer program code products (software), will be discussed in greater detail below in the following Detailed Description of the Invention and in connection with the attached drawing figures.

BRIEF DESCRIPTION OF THE DRAWINGS

FIG. 6A shows a sample XML output according to an aspect of the invention.

FIGS. 13A-13C are a series of screenshots illustrating a sample ePersona report generated in accordance with a practice of the present invention.

FIG. 16 is a screenshot depicting selected search results available according to an aspect of the invention, showing cross-links with security event information.

FIG. 17 is a screenshot showing a View Documents and Metadata screen generated in one practice of the invention.

FIG. 20 is a screenshot of website text extraction in accordance with an aspect of the invention.

DETAILED DESCRIPTION OF THE INVENTION

The present invention provides, among other aspects, methods, systems, devices and computer program code (software) products that enable full search access to the above-discussed forms of operations, including any data that is stored locally or remotely.

By way of background, it is noted that commonly owned U.S. patent application Ser. No. 12/046,966 filed Mar. 12, 2008, entitled "Network Traffic Capture and Replay with Transaction Integrity and Scaling," which is incorporated herein by reference as if set forth in its entirety herein, discusses various techniques involving the processing and utilization of Pcap files. A number of such techniques are incorporated into products and/or services commercially available from Dejavu Technologies, Inc. of Worcester, Mass., which offers a range of products and services relating to the parsing of Pcap files and the generating of XML attributes that characterize sessions and social networks for the network testing industry. Such products are currently used by telecommunications companies, network equipment manufacturers (NEMs), military, security and commercial market segments.

The present invention relates to new methods, systems and computer program code (software) products that converge both the network and content attributes of electronic traffic repositories, with the ability to accommodate large scale inquires. The resultant search set can be characterized within the construct of a social network. Aspects of the invention thus offers the combination of the ease of web-based search engines and the detail of packet inspectors.

The invention enables a user to query a search database based on either or both of (1) network content and (2) network traffic genetics, metadata, attributes, and the like. Traffic genetics, in turn, enables the user to search based upon network session information, including protocol headers, endpoints (MAC, IP and port addresses), attachment metadata, and the like.

The following description of aspects of the invention is organized as follows:

1. System Overview
2. Sample Session
3. System Operations
3.1 PCAP Files
3.2 Decompiler/Decomposer
3.21 Social Network Links
3.22 ePersona
3.23 Data Conversion
3.3 XML Representation
3.4 Attribute/Content Indexer; Search Engine
3.41 Other Databases
3.5 User Interface
3.6 Architectural Aspects
4. General Technique According to One Practice of the Invention
5. Functional Summary and Technical Advantages of Invention
6. Digital Processing Environment in Which Invention Can Be Implemented
7. Conclusion

1. System Overview

FIG. 1 presents a conceptual overview of a network traffic search system 100 according to a practice of the present invention, and FIG. 2 provides a schematic overview of the overall operations of system 100.

Figure 1:
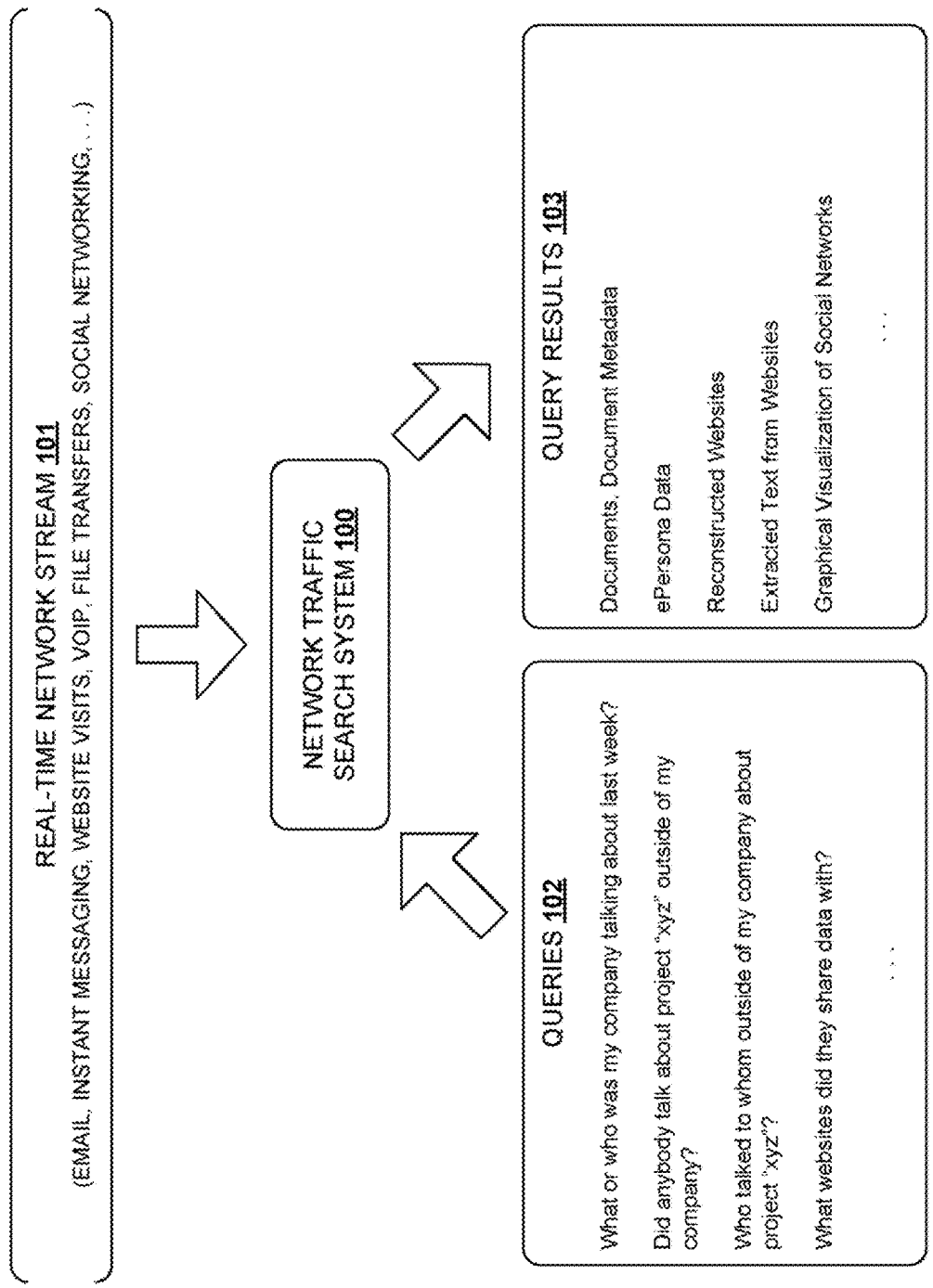
FIG. 1 is a diagram presenting a conceptual overview of a network traffic system according to an aspect of the present invention.
Figure 2:
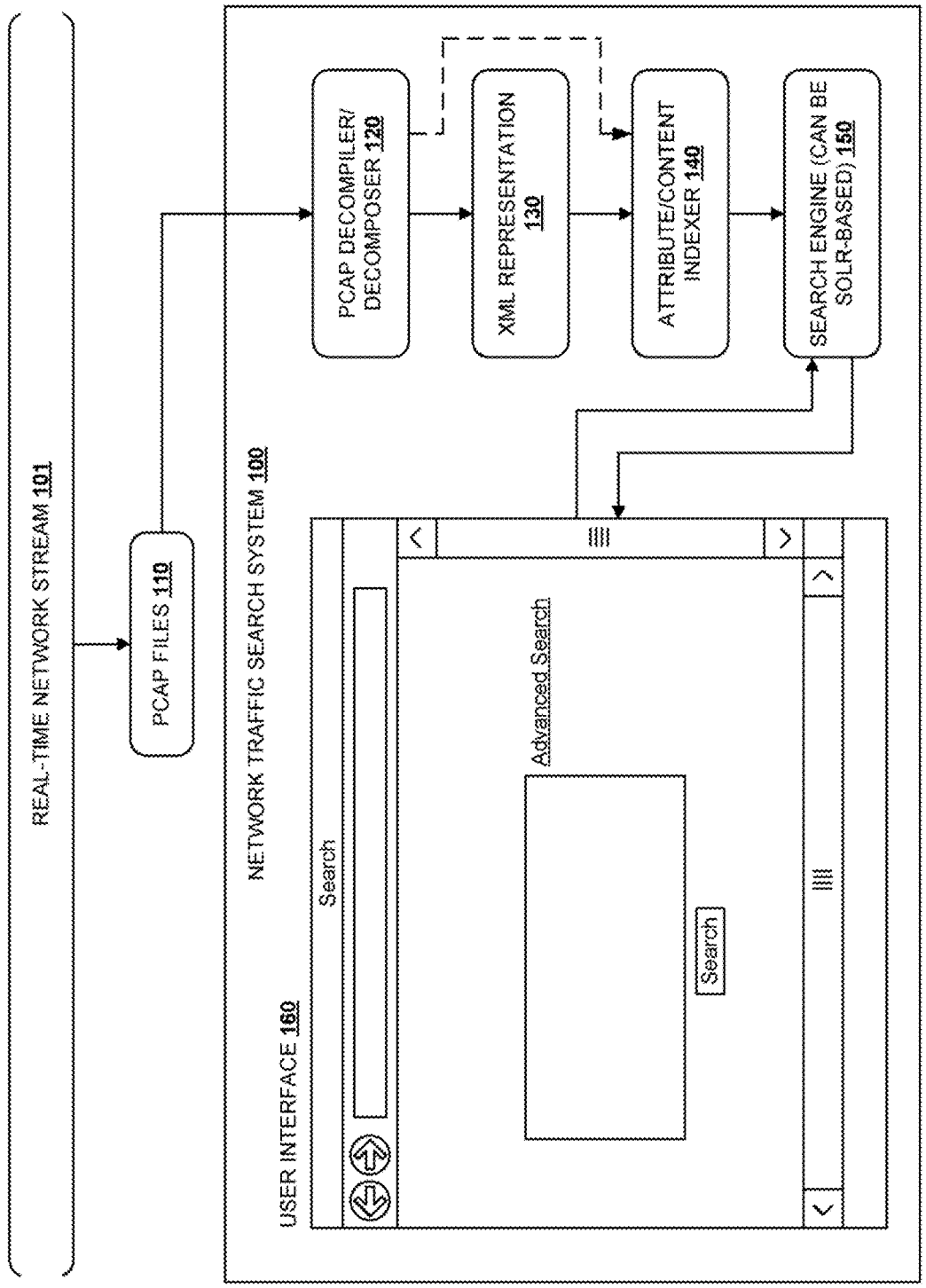
FIG. 2 is a schematic diagram providing an overview of the overall operations of the system shown in FIG. 1.

As shown in FIG. 1, system 100 is used to provide full textual search of network information captured from a real-time network stream 101, as well as information derived therefrom. Information can be derived from any of the following:

(1) email and document attachments, including those not otherwise archived. This can include webmail sites, such as Hotmail; unauthorized personal email, accessed through company networks; corporate email not logged, because it was sent and deleted between formal archive periods;

(2) instant messaging (IM) transcripts including: AIM, Yahoo, MSN, ICQ, Jabber, and the like;

(3) websites viewed, including reconstructed to the (best efforts) original form as seen; and personal blogs, wikis, web 2.0, and the like, both viewed, and contributed to;

(4) social networking sites and related transcripts, including Facebook transcripts (chats, walls, email, networks of "friends"); and similar transcripts from LinkedIn, MySpace, Twitter, Meetup, Flickr, and the like;

(5) audio and VoIP telephone calls to/from target custodians/users; which can be, optionally, converted to text and indexed for search;

(6) relational database accesses, including specific text queries and reports, during periods of interest, e.g., customer relationship management (CRM) or supply chain;

(7) remote access by custodians/users to CPUs and file servers, including transcripts of sessions/logins/commands, and including complete documents transferred; and (8) internet activity, by any custodians/users of interest, through the use of "unknown" protocols that possibly contain textual information of interest.

As further shown in FIG. 1, the network traffic search system 100 is configured to receive queries 102 from, and provide search results 103 to, a system user. Possible queries 102 include, for example:

- What or who was my company talking about last week?
- Did anybody talk about project "xyz" outside of my company?
- Who talked to whom outside of my company about project "xyz"?
- What websites did they share data with?
- What dates did the conversations take place?
- What files were shared within and outside my company?
- What were the contents of those files?
- Show me all the hosts that 10.3.4.5 touched in the last 48 hours.
- What applications did it touch?
- What files were touched? Modified? Transferred?
- What were the genetic characteristics of the intruder?
- Show me other sessions with these characteristics?
- Were there inappropriate conservations between two parties?
- Was inappropriate information shared between two parties?
- Was inappropriate it formation disseminated by an individual?

The network traffic search system 100 is configured to provide, in response to queries 102, various types of results 103 in various formats, described below. These include, for example: documents and document metadata, ePersona data, reconstructed websites, extracted text from websites, graphic visualization of social networks, and the like.

FIG. 2 provides a schematic overview depicting overall operations of one practice of the present invention. As shown in box 110, captured network packets and network sessions are compiled into Pcap files. In box 120, the Pcap files are then processed using a Pcap decompiler/decomposer that creates indexes for network sessions attributes, message contents and object contents. According to a further practice of the invention, streams of captured Internet Protocol network packets are processed in accordance with the techniques described herein for processing Pcap files.

In box 130, a Pcap decompiler output is generated comprising an XML file representative of sessions, messages, object attachments and indexes. According to a practice of the invention, the processed Pcap files are translated into rich XML (extensible markup language) documents or rich XML document-like entities. The rich XML documents or document-like entities are compiled into at least one searchable document-oriented database, such that packet-level IP network session data are converted into a form suitable for storage and query by search engine functionality, thereto to enable search and retrieval of network information. Searches can be enabled via content-based text indexing.

It is noted that XML is an intermediate format intended for applications that need access to the data. Thus, as indicated by the broken arrow connected boxes 120 and 140, the XML step can be bypassed in a practice of the described system, which increases performance by storing data directly into the search engine.

According to a further aspect of the invention, the rich XML documents or rich XML document-like entities include metadata extracted from network traffic. These metadata may include, for example: session time and duration, email server type, user agent web browser identification, protocol type, username, password, and email subject line. According to a practice of the invention, a subset of network metadata is identified that enables identification of the activity of at least one human user, or like entity, of the digital communications network.

In box 140, the database is indexed using an attribute/ content indexer and in box 150, a suitable search engine is used to conduct a search. A web-based user interface 160 provides a "front end" for the search engine, and is operable to receive inputs from, and provide outputs to, a system user.

As described in further detail below, one search engine that is suitable for use in the described practice of the invention is the Solr search engine, which is an open source enterprise search server based on the Lucene Java search library, with XML/HTTP and JSON APIs, hit highlighting, faceted search, caching, replication, and a web administration. The Solr search engine runs in a Java servlet container, such as Apache Tomcat. See, e.g., lucene.apache.org/solr.

Practices of the present invention can be offered in the context of a secure hosted environment, in which archives and Pcap files are imported using an encrypted transport protocol. Alternatively, practices of the invention can be implemented in an appliance-based or device-based system located at the user's selected facility.

The system 100 illustrated in FIGS. 1 and 2 provides, among other aspects, a powerful, substantially universal search engine facility for network forensics, offering, among other technical advantages, the following:

(1) document-centric architecture for search engines, including robust searches, fast searches, and rich documents;

(2) unlimited scalability, with no SQL overhead, and the ability to employ known SOLR methodology and systems;

(3) distributed architecture, requiring little network bandwidth, and enabling network based queries; and (4) comprehensive stream decompilation, which can include any of the following: POP3, SMTP, IMAP streams; web mail, email streams, social networks, blog streams; VoIP, HTTP, CIFS streams; FTP, Oracle, DNS streams; MSN, ymsg, oscar, AIM, ICQ, jabber, Gmail; and the like.

2. Sample Session

Figure 3:
FIGS. 3-5 are a series of screenshots from a sample search session using the system shown in FIGS. 1-2.
Figure 4:
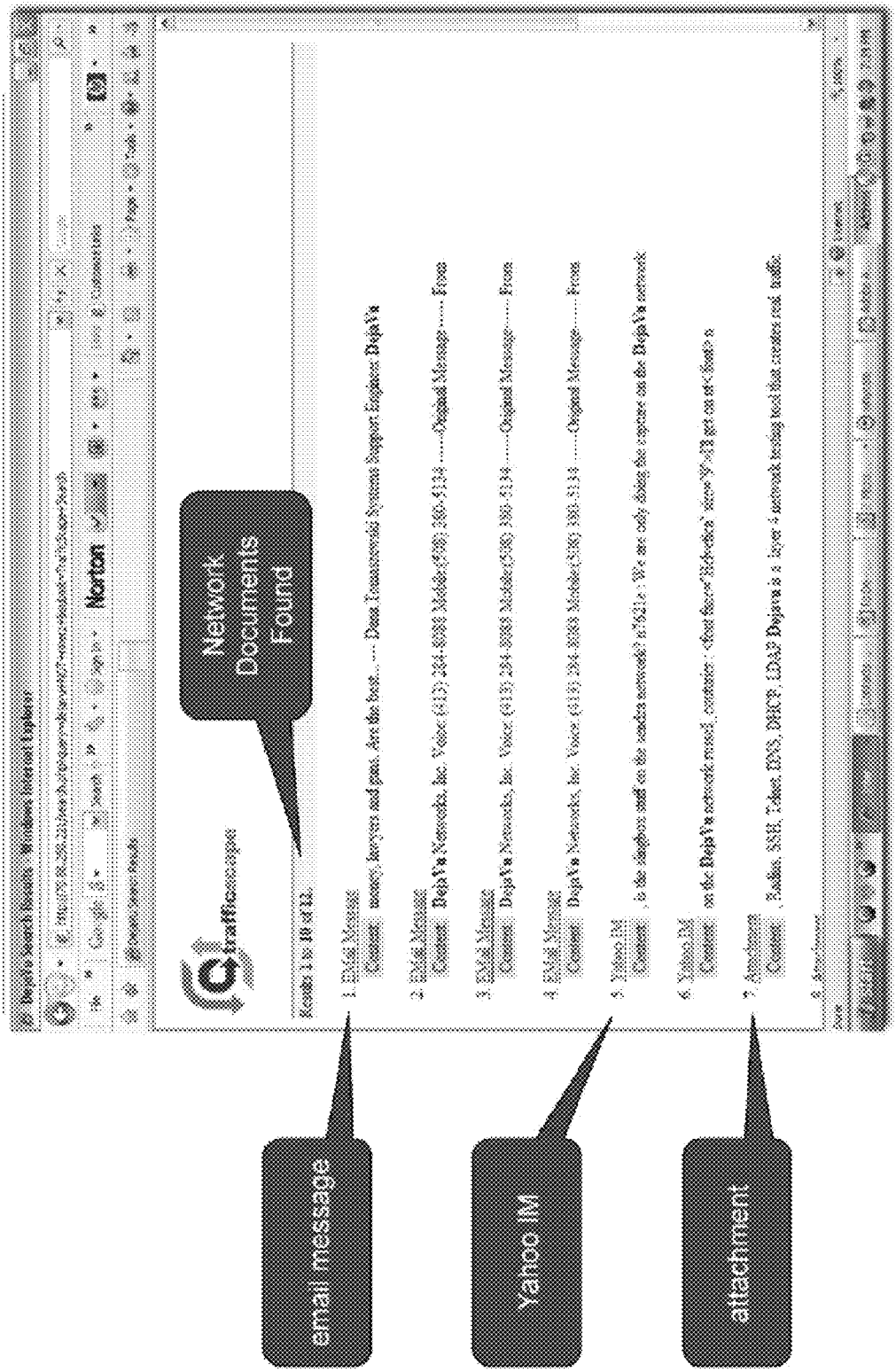
Figure 5:
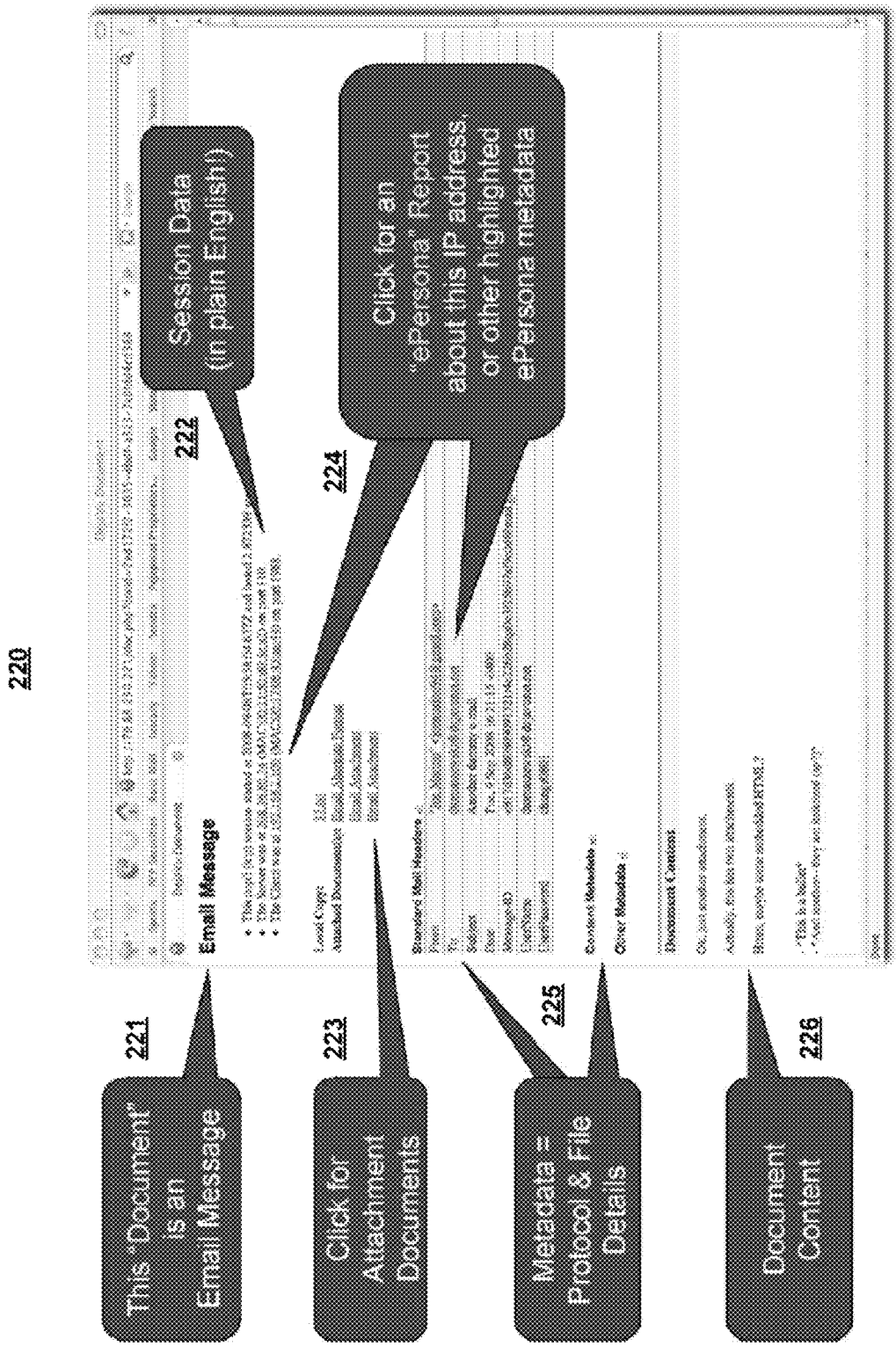

FIGS. 3-5 are a series of screenshots from a sample search session using the system 100 shown in FIGS. 1-2. The depicted search session provides further context for the description of specific system components in Section 3.

In FIG. 3 is a screenshot of a search page 200 that has been accessed through a web browser. The search screen 200 includes a text input box 201 for receiving freeform, Boolean search queries. The system searches for all text content across every protocol, including all application file content and extracted metadata content. In addition, alternatively, a user may click on link 202 to access a web page containing advanced search options.

For the purposes of the present discussion, it is assumed that a user enters the Boolean search term "dejavu NOT rmerz" in text box 201, and then clicks on the "TrafficScape Search" button 203. FIG. 4 is a screenshot of the results page 210 that is returned. In the depicted example, the search system has returned a statement as to the number of documents found 211, and a number of different types of items, including one or more email messages 212, Yahoo messages 213, and attachments 214. Items are provided with a hyperlink that provides access to additional information regarding that item.

For the purposes of the present discussion, it is assumed that a user clicks on a hyperlink for an email message 211. FIG. 5 is a screenshot of the page 220 that is returned.

Page 220 includes a title 221 identifying the document as an email message. Session data 222 is displayed under the title. Hyperlinks 223 are provided for attachment documents. Hyperlinks 224 are also provided for an ePersona report, described below, about the target IP address, or other highlighted ePersona metadata. Metadata 225, comprising protocol and file details, are also displayed. The document content 226 is displayed at the bottom of screen 220.

TrafficScape XML Output

The normal output of the TrafficScape TSdump decoder process comprises XML files and associated extracted or "raw" files (e.g., documents attached or transferred within sessions). TrafficScape has the option to produce two types of XML files, one containing SUMMARY information, and the other containing DETAIL information.

Figure 6B:
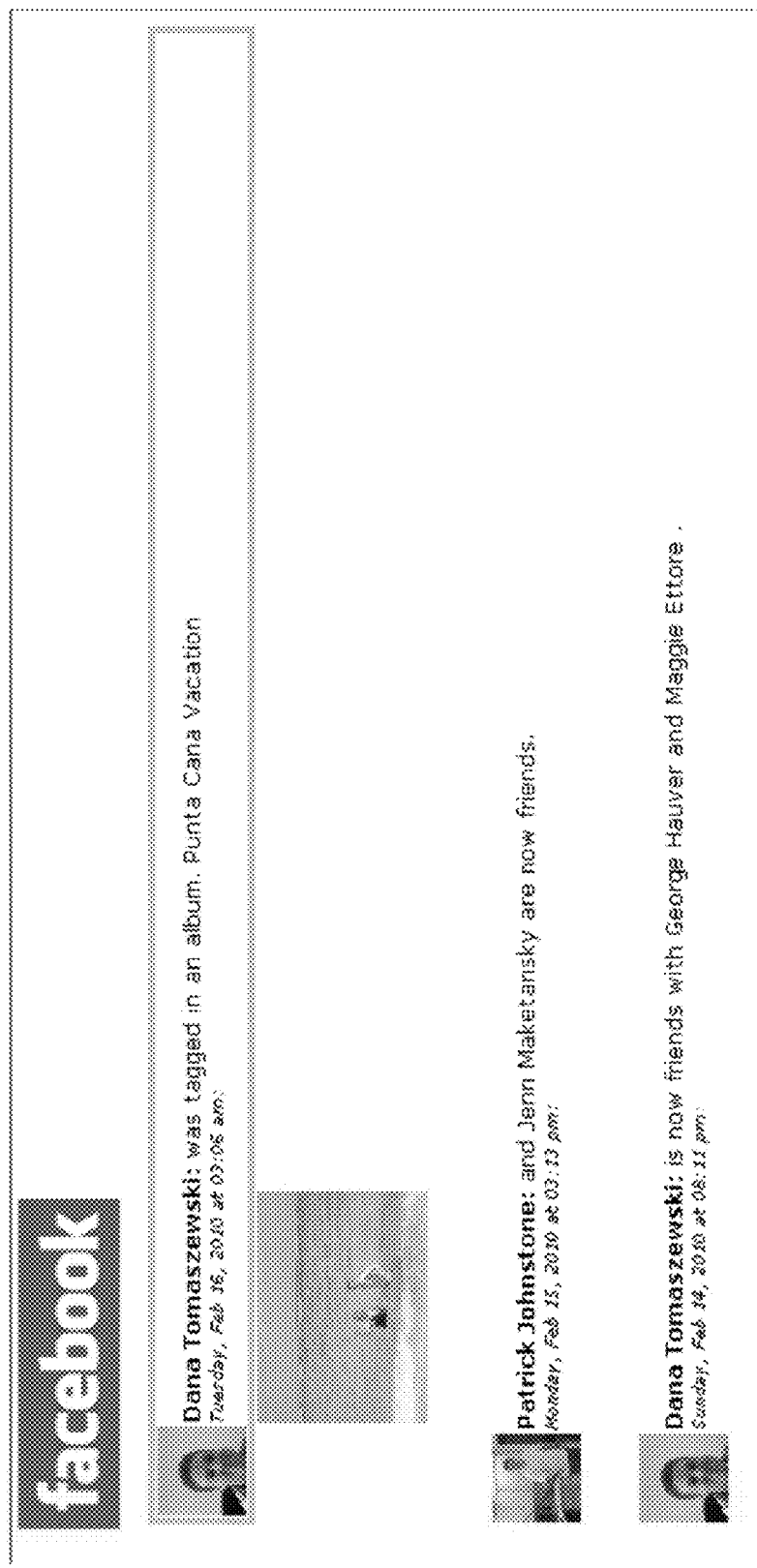
FIG. 6B is a sample web page showing how the URL tag is used to generate a view.

FIG. 6A shows a sample SUMMARY XML output. A sample DETAIL XML output is set forth in the Computer Program Listing Appendix, submitted herewith. FIG. 6B is a sample web page showing how the URL tag is used to generate a view.

The SUMMARY file contains a subset of information from the DETAIL file. The SUMMARY file is a file of convenience, and provides a customer with the ability to create a summary transaction record that are viewable within the customer's own system. For example, the SUMMARY could be used by a researcher of a law enforcement official. One feature of the SUMMARY file is a URL, which can be used to display the session correctly within a web browser.

The DETAIL XML file contains the following information:

Collection & group attributes (provided by the user with the packet data for case management purposes);
Network endpoints (IP, MAC, Port);
Complex protocol pointers (control and rtp stream info)
Protocol attributes (POP, HTTP, SIP, and the like)
Relevancy
Content
E-persona electronic identifiers and extracted attributes
Pointers for reconstructing complex sessions
Facebook live update
Facebook chats
Email messages and attachments
Chat attachments and video/audio
External file information
Etc.

Figure 6C:
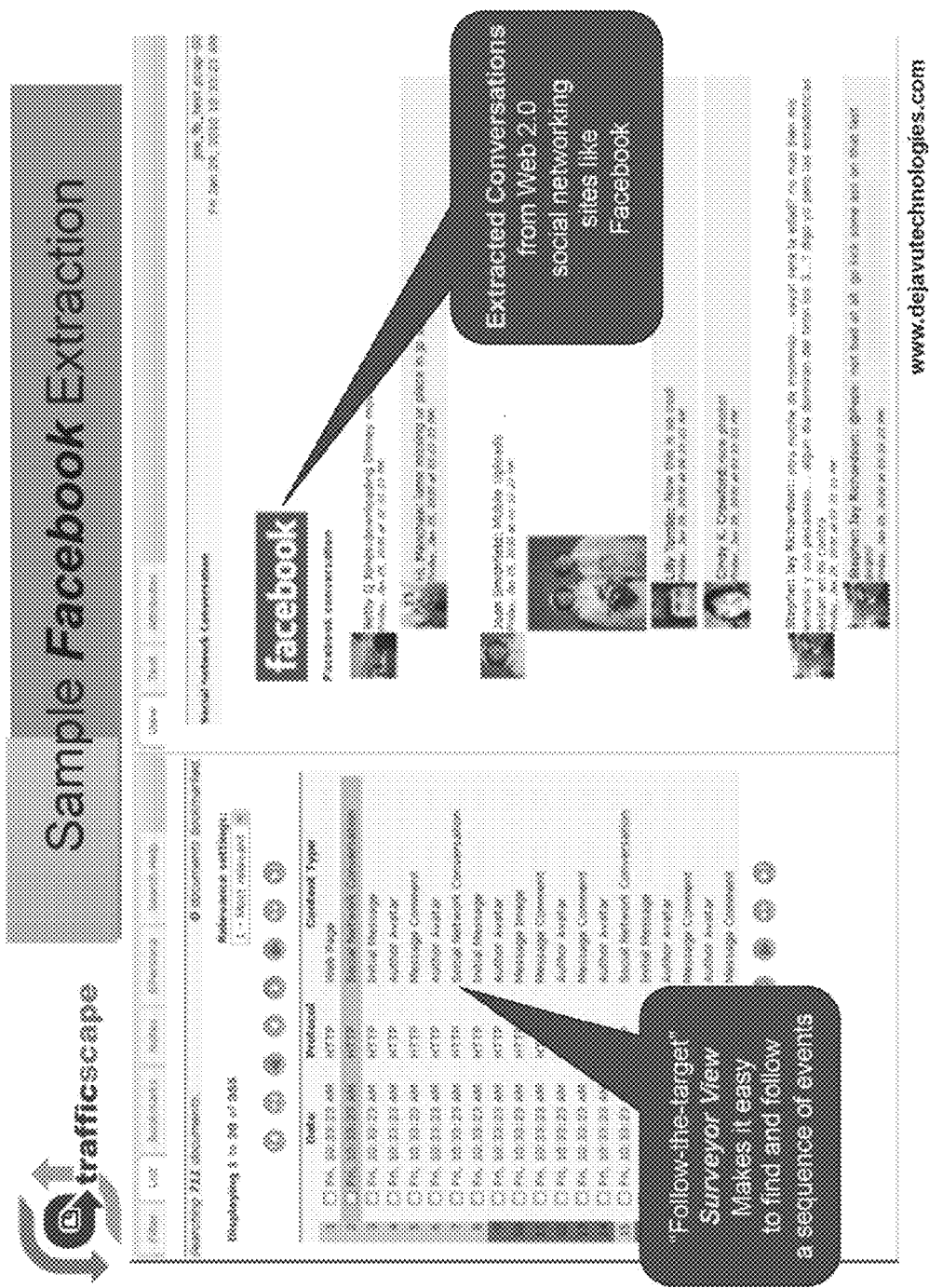
FIG. 6C is a web page of the reassembled visual document.

The decoder process is multi-threaded and optimized for performance, handing sessions off to threads for decoding. It breaks the streams down into atomic sessions, with relations stored within the XML data that allow an external viewer to re-assemble a "visual document." FIG. 6C is a web page of the re-assembled visual document.

An aspect of the present invention decompiles and decomposes information from captured network traffic, and then creates an XML representation of individual items within the captured network traffic. This XML representation includes both data traveling through the network stream, and metadata regarding various attributes of the data.

The following section provides a detailed description of various components of a network traffic search system according to one practice of the present invention.

3. System Operations

As shown in FIG. 2, a practice of the present invention includes the following overall operations that involve the conversion of captured network packets and network sessions in the form of Pcap files or data streams (box 110):

translating the Pcap files into rich XML (extensible markup language) documents or rich XML document-like entities (boxes 120 and 130), and compiling the rich XML documents or document-like entities into at least one searchable document-oriented database, such that packet-level IP network session data are converted into a form suitable for storage and query by search engine functionality, thereby to enable search and retrieval of network information (box 140), and providing search engine functionality to enable a user to execute searches on the searchable database (box 150) using a provided user interface (box 160), thereby to identify information transmitted by, received by, or exchanged with the given human or non-human entity.

These operations are discussed below.

3.1 PCAP Files

Conventional operating systems commercially available from, or utilizing, Microsoft, Apple, and Linux-based products, can generate a file that contains a representation of all, or substantially all, network traffic for a selected network interface card (NIC) for a selected time period. The file is referred to as a Pcap file. This file can be generated via a TCPDUMP command, a Wireshark/Ethereal packet inspector, or the Pcap libraries. In addition, as described below, the Pcap file also includes session protocol information, including network attributes. Pcap data can be delivered in the form of Pcap files, as described above, or for a more high-performance system in the form of a stream of digital data, for example via shared memory or a network socket, containing the same formatting of information as in a Pcap file, thereby bypassing the step of creating Pcap files on a disk. For the purpose of the present description, "Pcap file" refers to packet capture data delivered as either a file or as a stream.

According to one practice of the invention, the processes described hereinbelow use as a starting point Pcap files that have already been created. It will be appreciated that systems and processes according to aspects of the present invention could also include components for generating Pcap files.

Figure 7:
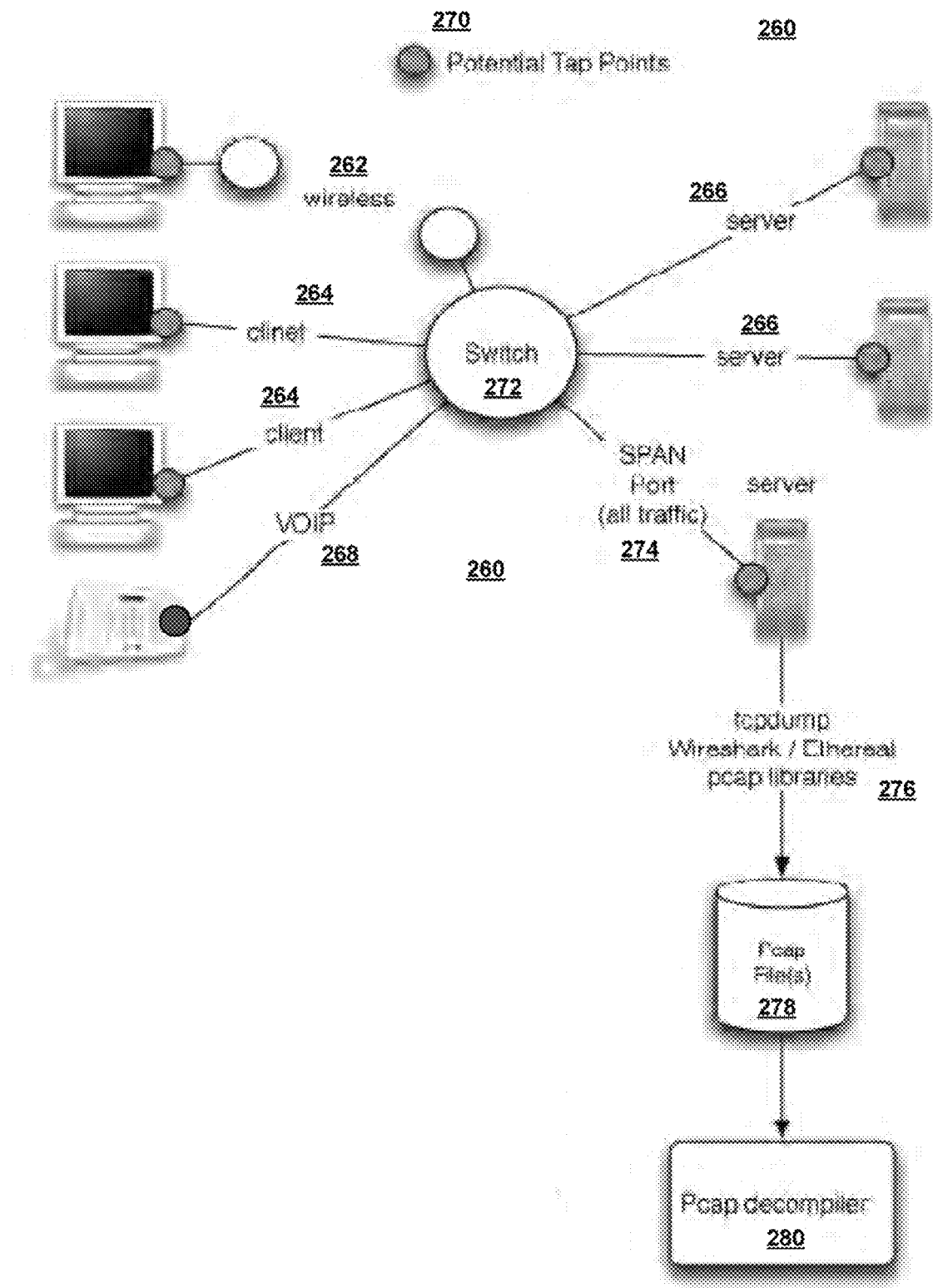
FIG. 7 is a network diagram depicting potential tap points that can be utilized to access and search information in accordance with an aspect of the invention.

FIG. 7 is a schematic block diagram of an exemplary relatively conventional network environment 260, including a wireless connection 262, a number of client devices (such as PCs or workstations) 264, servers 266, and a VoIP device 268. FIG. 7 depicts potential tap points 270 that can be utilized to access and search information in accordance with an aspect of the invention. As shown therein, the network 260 can include a conventional switch 272 to allow the intercommunication of the network elements. In accordance with a practice of the present invention, each of these elements presents a selected tap point 270 for the invention.

Typically, generating a Pcap file from a single host only captures traffic originated or terminated from that host. However, most conventional switches have a SPAN (Switched Port ANalyzer) port 274 that aggregates all network traffic and can be connected to an intelligent host server 276, of conventional design and operation. This traffic can be dumped to a Pcap file 278 by host server 276.

According to a further practice of the invention, it is possible to connect to a SPAN port on a high-performance network switch located at each facility to be monitored. Capture methods should have minimum impact on network performance.

3.2 Decompiler/Decomposer

One aspect of the invention relates to converting binary, packet-level IP network session data into a form suitable for storage and query by available search engine methods for large scale retrieval of network information based on full content text indexing.

A further aspect of invention further relates to converting IP session messages, transactions, and protocol sequences into "documents," for storage in a document-oriented database. This process converts hierarchical network protocol information (such as, for example, IP TCP→HTTP→Webmail→Hotmail→ListDisplay→MessageDisplay) into a flat set of documents, allowing optimally efficient application of known engine methods.

Another aspect of the invention is a flat, network-document architecture for describing generic actions and behavior on complex Web 2.0 websites such as blogs, webmail (Hotmail, Gmail, CCMail, and the like), and social networking sites (Facebook, Linkedin, MySpace, and the like).

Figure 8:
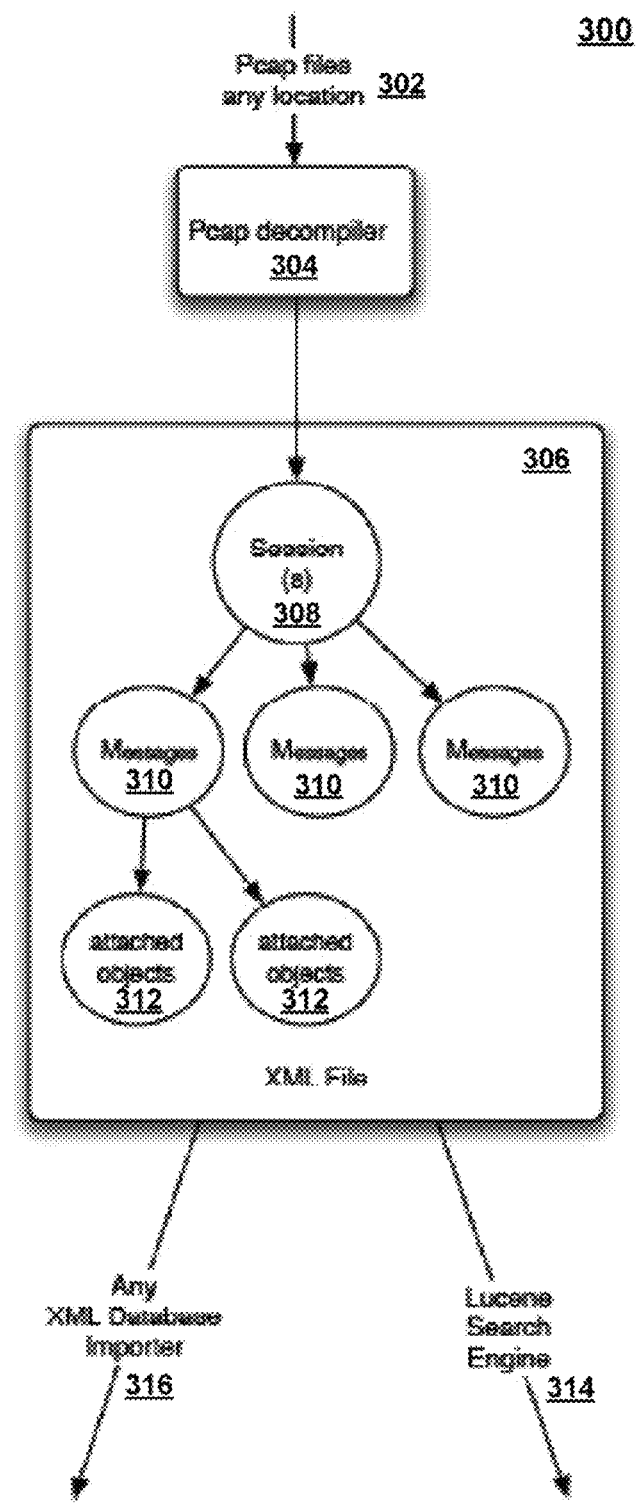
FIG. 8 is a schematic block diagram providing additional detail with respect to the decompilation and decomposition of Pcap files according to a practice of the invention.

FIG. 8 is a schematic flow diagram 300 providing additional detail with respect to the decompilation and decomposition of Pcap files according to a practice of the invention. As shown in FIG. 8, Pcap files 302 are fed to a decompiler/decomposer 304, which generates an XML file 306, in which each session 308 is broken down into messages 310. Messages 310, in turn, can contain objects 312 such as documents, images, audio files, and the like. For example, one may refer to "Popping" email as a TCP POP3 session 308 that contains multiple email messages 310, and each message can contain attachments or attached objects 312. (POP is an abbreviation for the internet protocol whereby received emails are collected from some Point-Of-Presence on the internet.) The XML file 306 is then fed to a search engine 314 and other XML database importer 316.

Another example is provided by an IM session that contains multiple messages, and further includes file transfers or voice chats as attachments to the message. Still another example is provided by a VoIP phone call, wherein the call is the session, and the audio is the voice attachment.

In accordance with one practice of the invention, attributes of the session are broken down into two components: (1) session/message/attachments; and (2) session protocol information.

Figure 9:
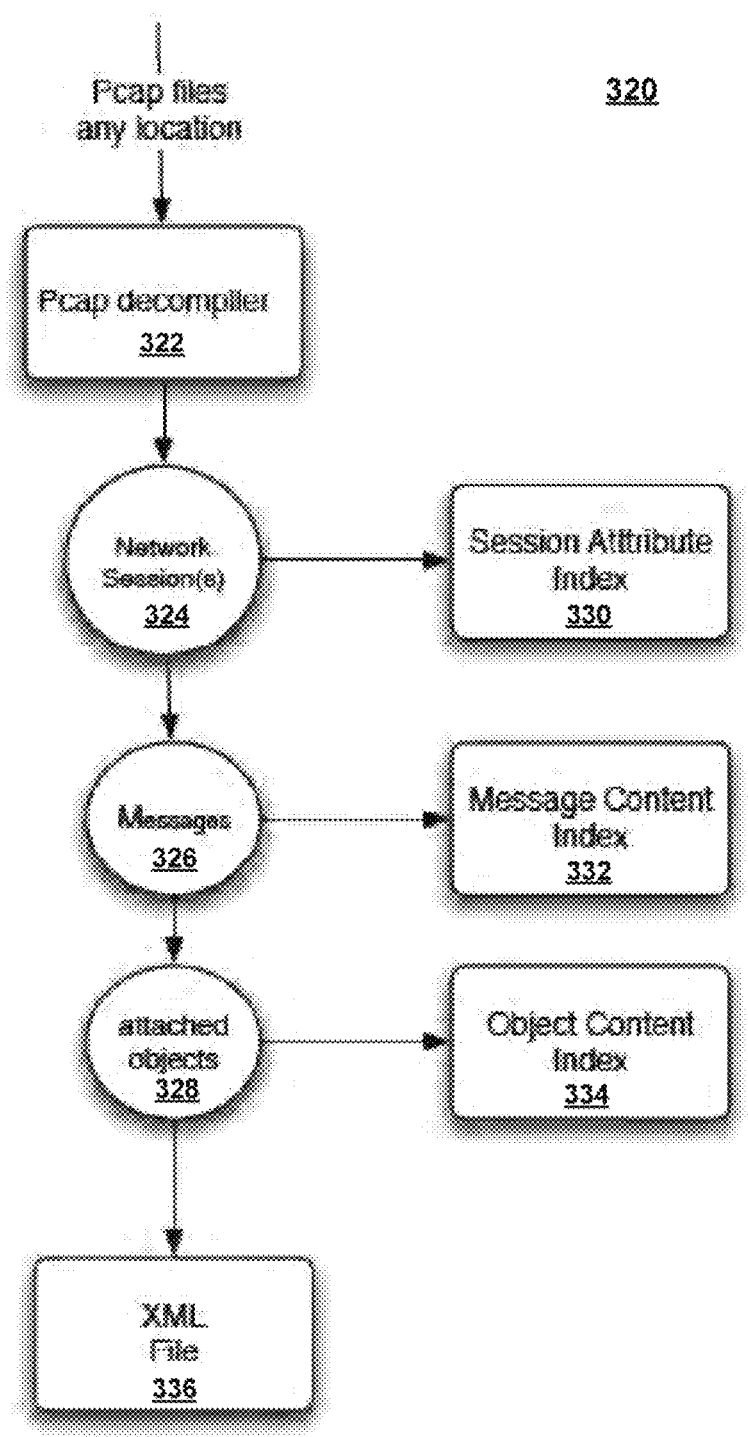
FIG. 9 is a flow diagram illustrating the decompilation of Pcap files.

Session protocol information or data are protocol specific attributes that provide network genetics comprising any of the following: protocol headers; MAC, IP and port addresses, and attachment metadata. Specific examples of these include, but are not limited to, the following:

HTTP/POP/SMTP Headers
Session Endpoints (MAC, IP, Port addresses)
Protocol Attributes (Get, Put, etc.)
Routing Attributes (IP, TCP, VoIP, etc.)
Other Selected Items FIG. 9 is a schematic flow diagram 320 providing additional detail of the operation and outputs of the Pcap Decompiler/Decomposer 322. As shown therein, the Pcap decompiler 322 also creates respective indexes 330, 332, 334 for the network session attributes 324, message contents 326, and object contents 328. In the case of attached audio files, for example, these can be converted to text and also indexed. The output, as depicted in FIG. 9, is a single XML file 336 representative of sessions, messages, object attachments, and indexes.

Figure 10:
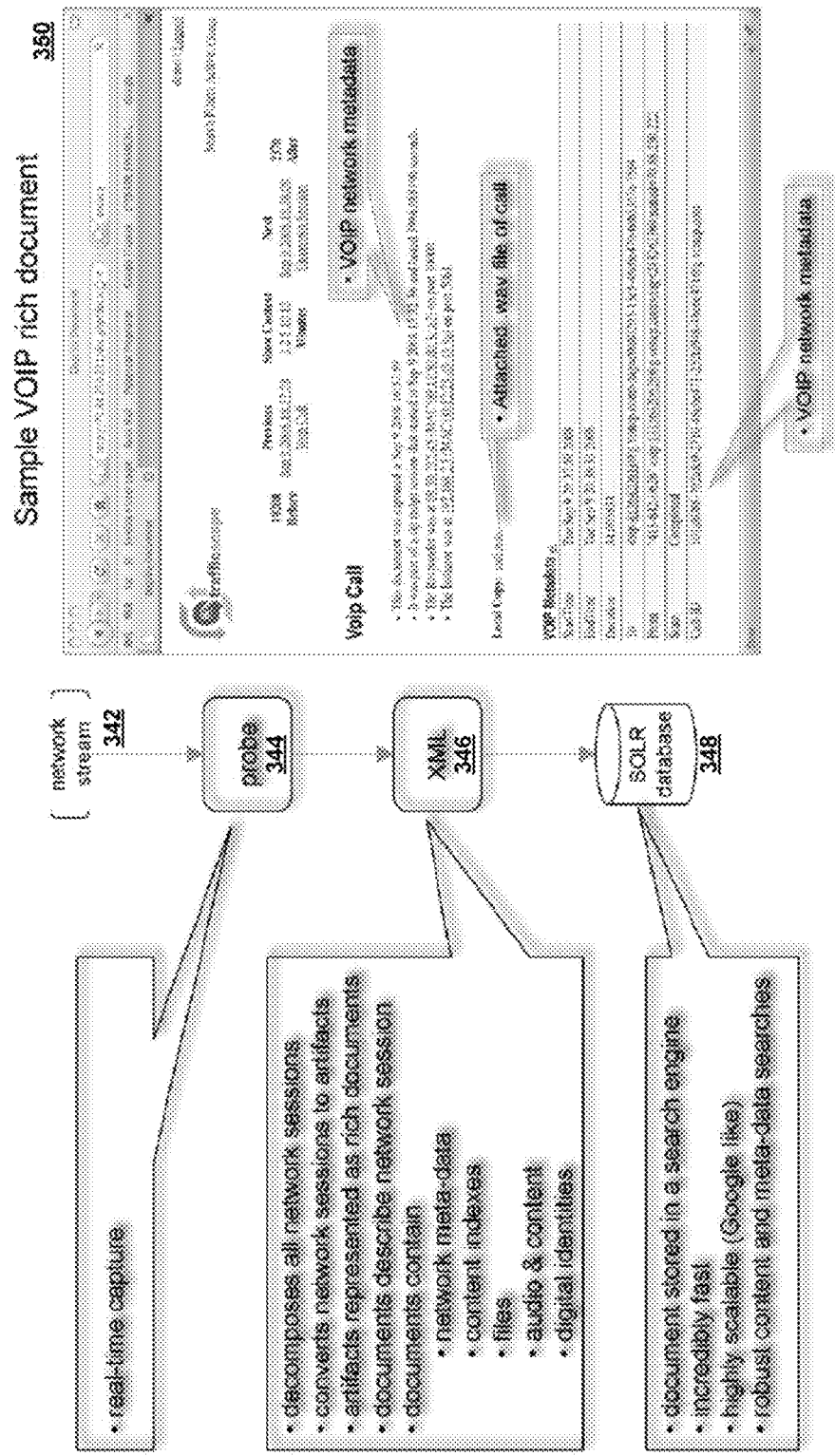
FIG. 10 is a flow diagram illustrating further aspects of stream decompilation in accordance with a practice of the invention.

FIG. 10 is a flow diagram 340 illustrating aspects of stream decompilation in accordance with a practice of the invention. As shown in FIG. 10, a probe 344 is used to conduct real-time capture of network sessions from a network stream 342. All network sessions are decomposed. Network sessions are converted to artifacts, which are represented as rich documents. The documents describe network sessions, and contain network metadata, content indexes, files, audio and content, and digital identities. In the FIG. 10 example, the result of the decomposition and data conversion in a rich XML document 346.

The subset of network metadata that is closely associated with human users of the network can include any of the following: email address IP address, MAC address, URL, name, postal address, telephone/VoIP numbers, IM chat "handles," social network identifiers (IDs), website domain names, and various types of Personally Identifiable Information (PII), such as social security numbers or credit card numbers. The list of data extracted is significant because it is the basis for building social network lists, and for resolving the identities of people using the network, which are two key uses of the ePersona feature, discussed below.

Specifically, the subset of network metadata is utilized for identity resolution, wherein identity resolution comprises the identification of specific, individual human users, or like entities, of the network. According to a practice of the invention, identity resolution includes the utilization of the subset of network metadata to construct a database of social network links. The database of social network links includes identification of "contacts," which comprise human individuals or other entities with whom a human or non-human entity under investigation communications, and "contacts of contacts," which comprise human or non-human entities with whom the contacts of the entity under investigation communicate. In addition, the database may be utilized to identify links between network users, even if the network users utilize different identifiers to communication with different contacts. According to a further practice of the invention, in response to selected keyword searches by a human user of the search engine functionality, the system correlates any or all of the following: human identities, inter human relationships, conversations and network metadata, computers, physical locations, electronic locations, internet IDs, cellular IDs, and computers.

The list is expandable. It will be appreciated that the list is not intended to be exhaustive, and that aspects of the invention are application in modified or expanded contexts.

The rich XML document 346 is then stored in a search engine database 348. In the present example, the Solr search engine is used because it is fast, highly scalable, and supports robust content and metadata searches.

FIG. 10 further shows a sample VoIP rich document 350. The rich document 350 includes VoIP network metadata, a link to an attached .wav file of the call, and VoIP network metadata.

3.21 Social Network Links

In a further practice of the invention, the decompilation/ decomposition and data conversion processes are used to construct a database of social network links. This database can identify, among other aspects:

(1) Contacts: Individuals or other entities with whom the investigative target (person or entity under investigation) communicates, and (2) Contacts of Contacts: In turn, who the investigative target's contacts communicate with.

In accordance with this practice of the invention, the database can identify links between users, even if they use different names/handles to communicate with different contacts. The database can be stored in association with or in a manner accessible to a known or generic search engine, so that using known search engine methods, associations between data elements can be exposed, identified, and displayed optimally.

Thus, in a system constructed in accordance with the invention, resulting network documents can be retrieved by searching based on particular keywords across either or both of the text content and the metadata terms.

A further practice of the invention provides for visualization of social networks. The XML documents and metadata can be passed to graphic visualization software tools for the display of visually complex data representations. In particular, the data relationships exposed by metadata of the kind discussed above can be represented as graphical displays of "social network diagrams."

Figure 11:
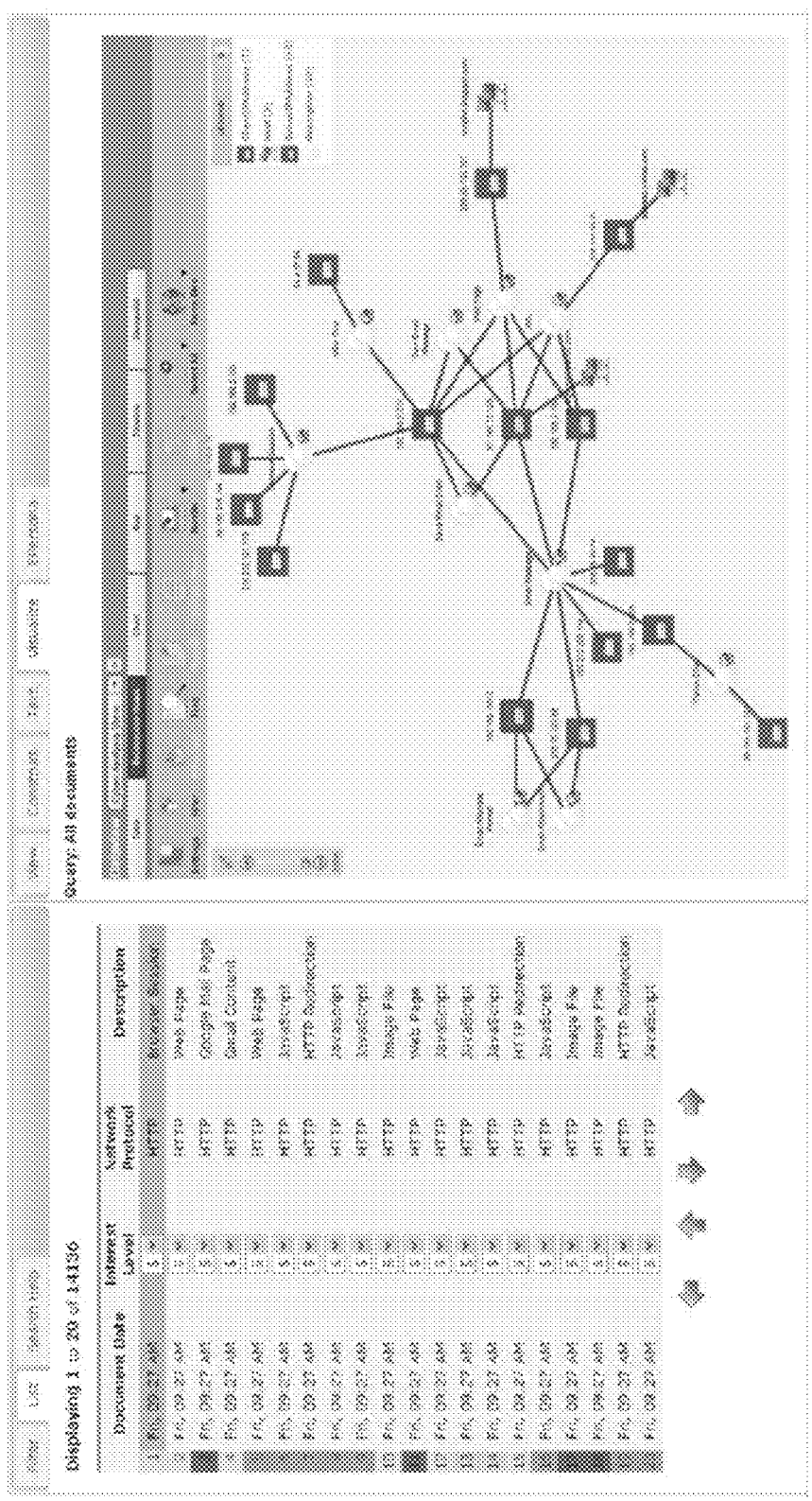
FIG. 11 is a screenshot of a sample web page display of a social network diagram according to a further aspect of the invention.

(By way of reference, the concept of social network diagrams is discussed at the following: http://en.wikipedia.org/wiki/Social_network.) FIG. 11 is a screenshot 360 illustrating an example of a web page display such a social network diagram.

3.22 ePersona

Figure 12:
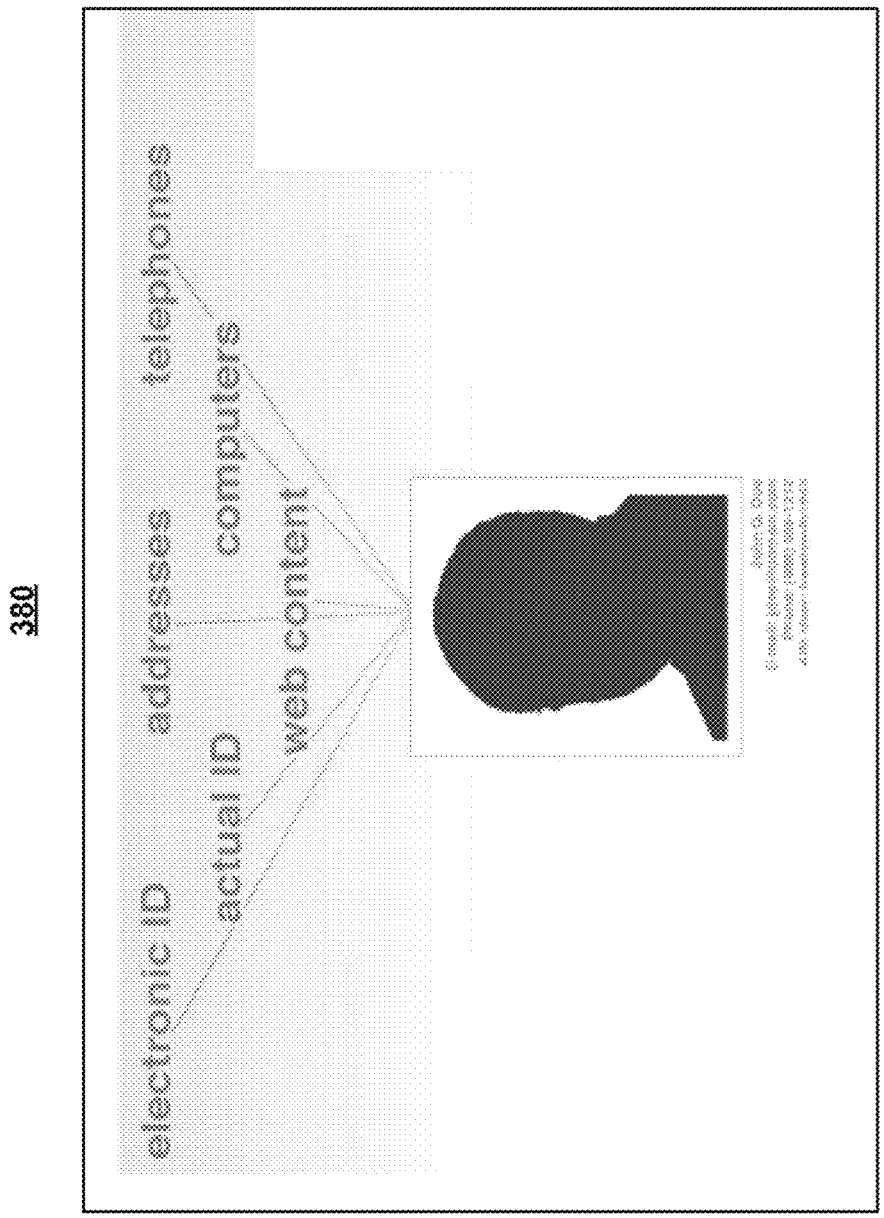
FIG. 12 is a conceptual diagram of a further practice of the invention referred to herein as "ePersona."

FIG. 12 is a conceptual diagram 380 of a further practice of the invention referred to herein as "ePersona." As shown in FIG. 12, ePersona provides a technique whereby data extracted from a network data stream is correlated with respect to a digital identity. The correlated data can include, for example: electronic IDs addresses, telephones, actual IDs, computers, and web content.

The ePersona feature is substantially an extension of the decompilation methodology of an aspect of the invention, giving particular attention to the subset of network metadata that is closely associated with human users of the network. It cross-indexes identities, relationships, conversions, and network metadata, and allows a human operator of practices of the invention to investigate digital identities using simple keyword searches. It can correlate computers, physical locations, electronic locations, internet IDs, cellular IDs, computers, and other information.

Figure 13A:
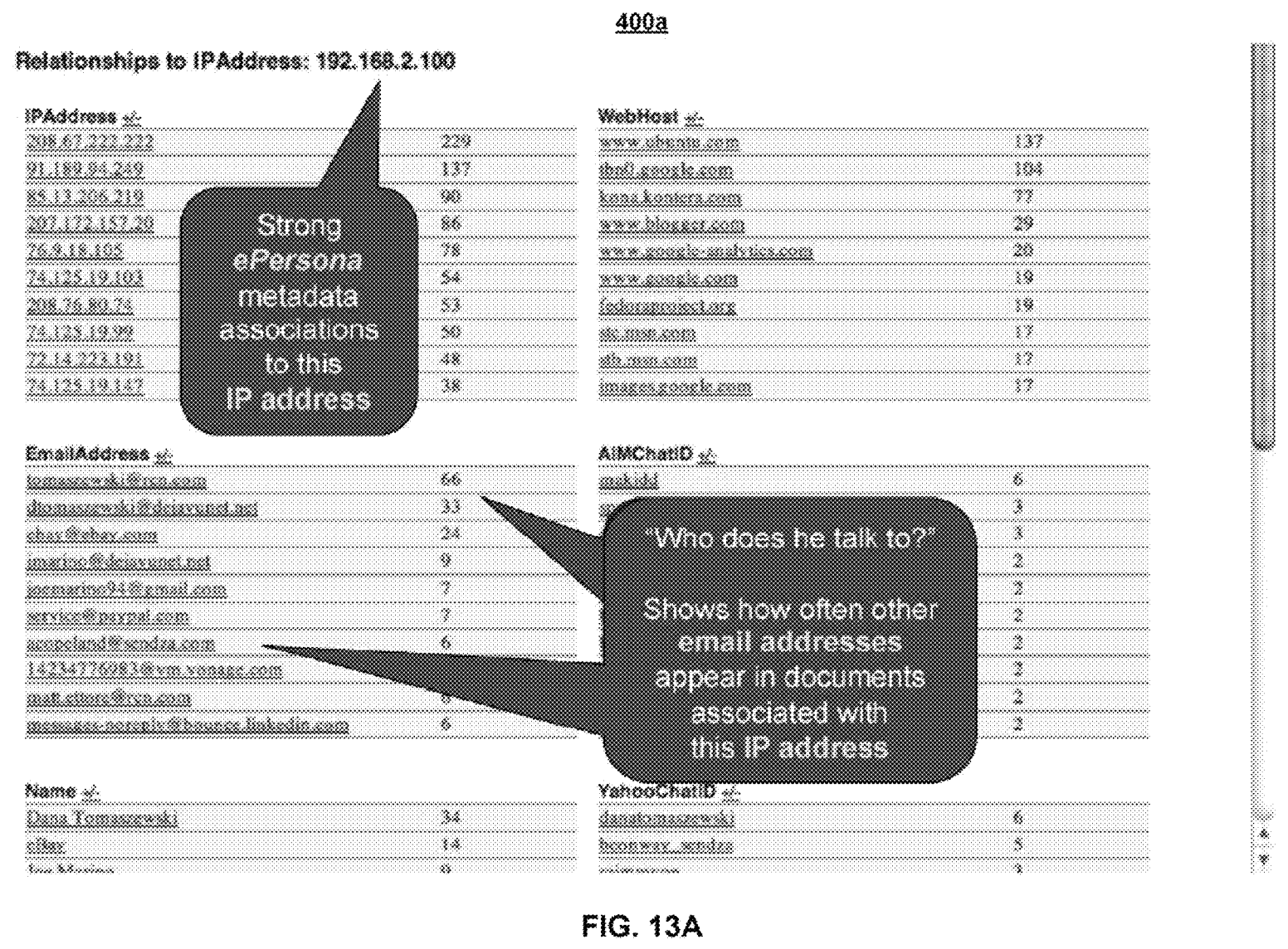
Figure 13B:
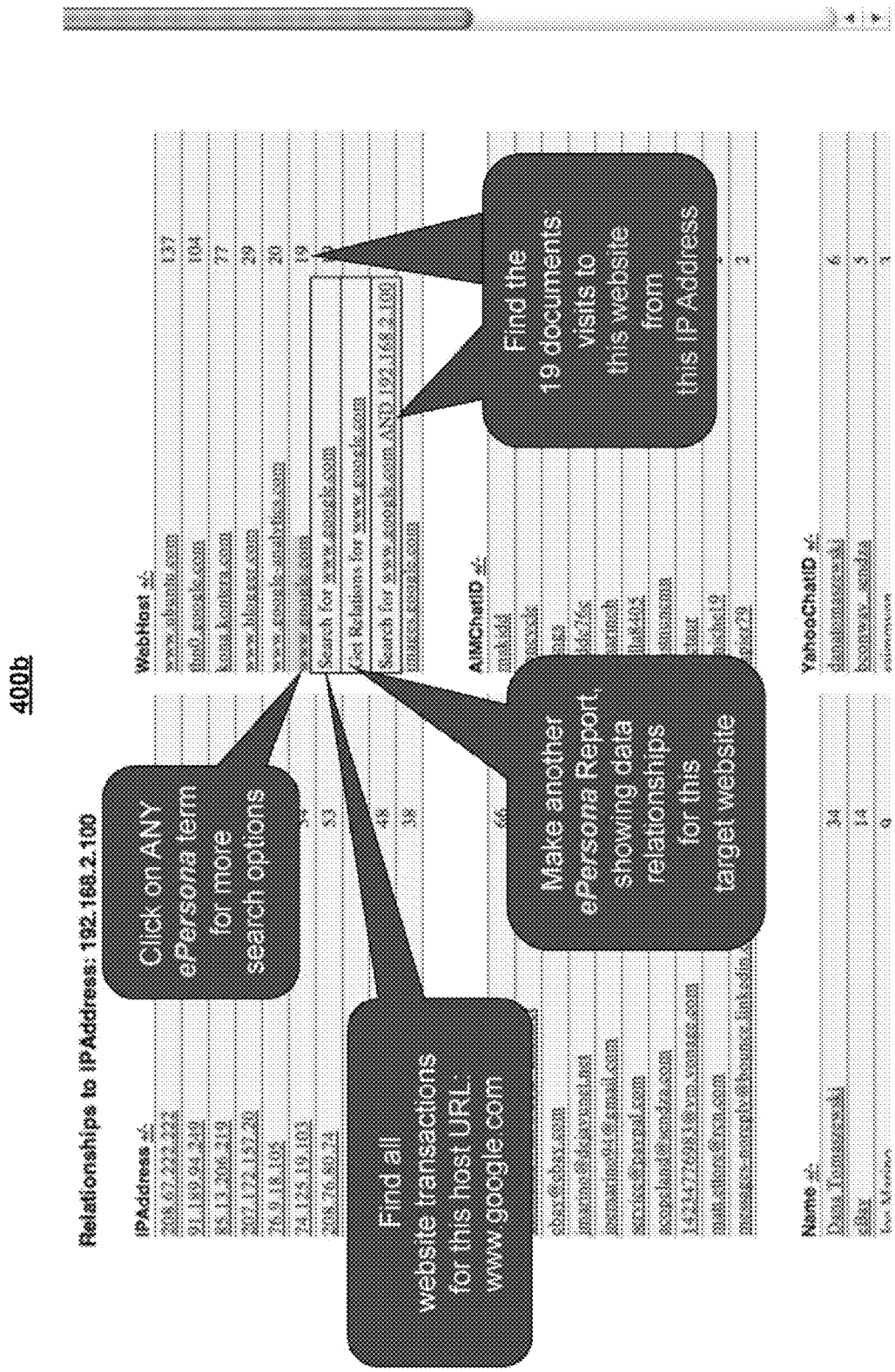
Figure 13C:
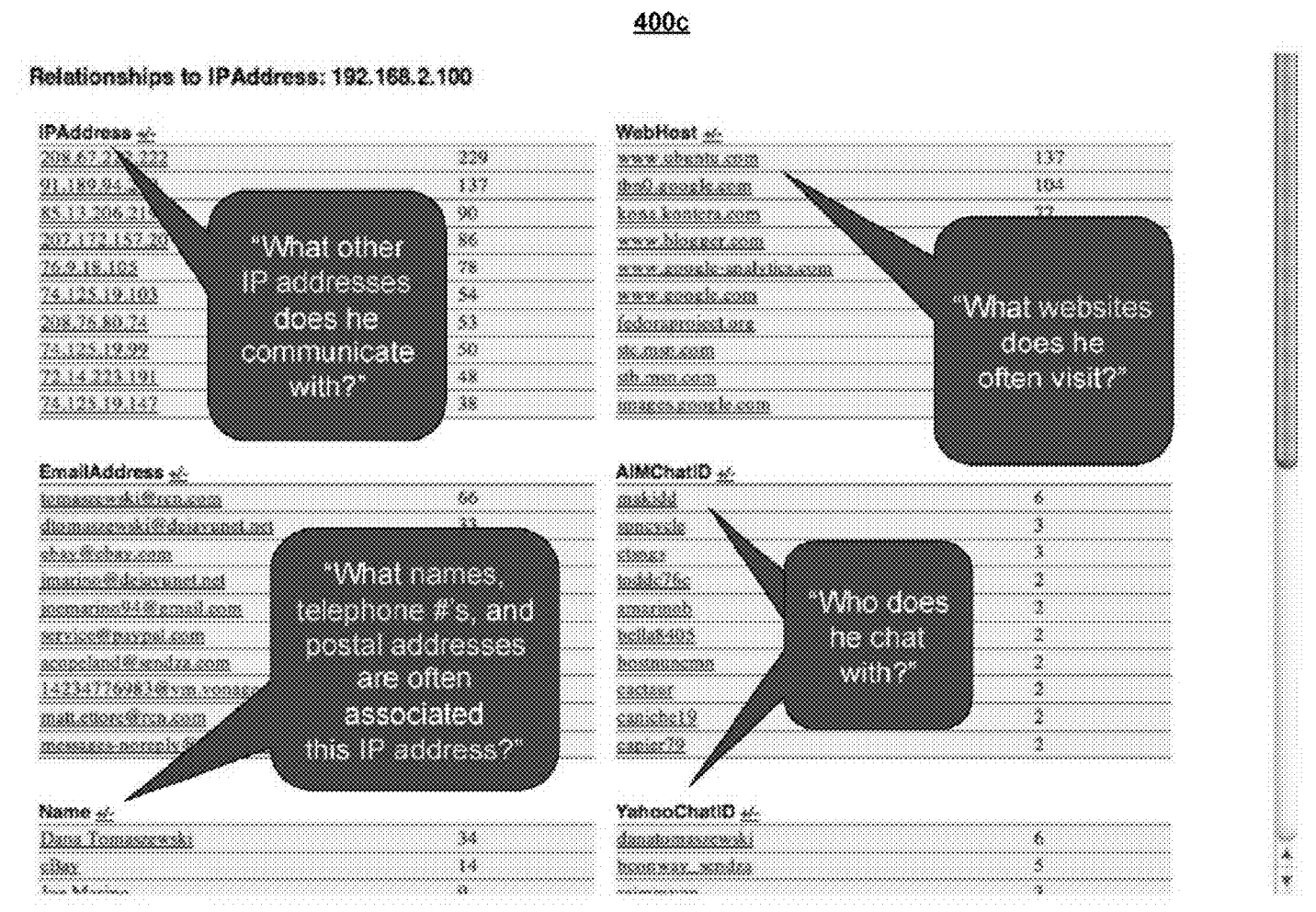

FIGS. 13A-13C show a sample ePersona report 400a-c generated in accordance with aspects of the present invention. The ePersona displays strong metadata associations to a digital identity. In this case, the digital identity is the IP address 192.168.2.100.

As shown in FIG. 13A, in response to the query Who does he talk to?, ePersona returns a list indicating how often other email addresses appear in documents associated with the IP address.

As shown in FIG. 13B, it is possible to click on any ePersona item for more search options. For example, it is possible to find all website transactions for the host URL www.google.com. It is possible to make another ePersona report, showing data relationships for the target website. In addition, it is possible to find the 19 documents relating to visits to the target website from the IP address being searched.

As shown in FIG. 13C, ePersona also provides answers to the following queries:

What other IP addresses does he communicate with?
What names, telephone numbers, and postal address are often associated with this IP address?
What websites does he often visit?
Who does he chat with?

3.23 Data Conversion

Figure 14:
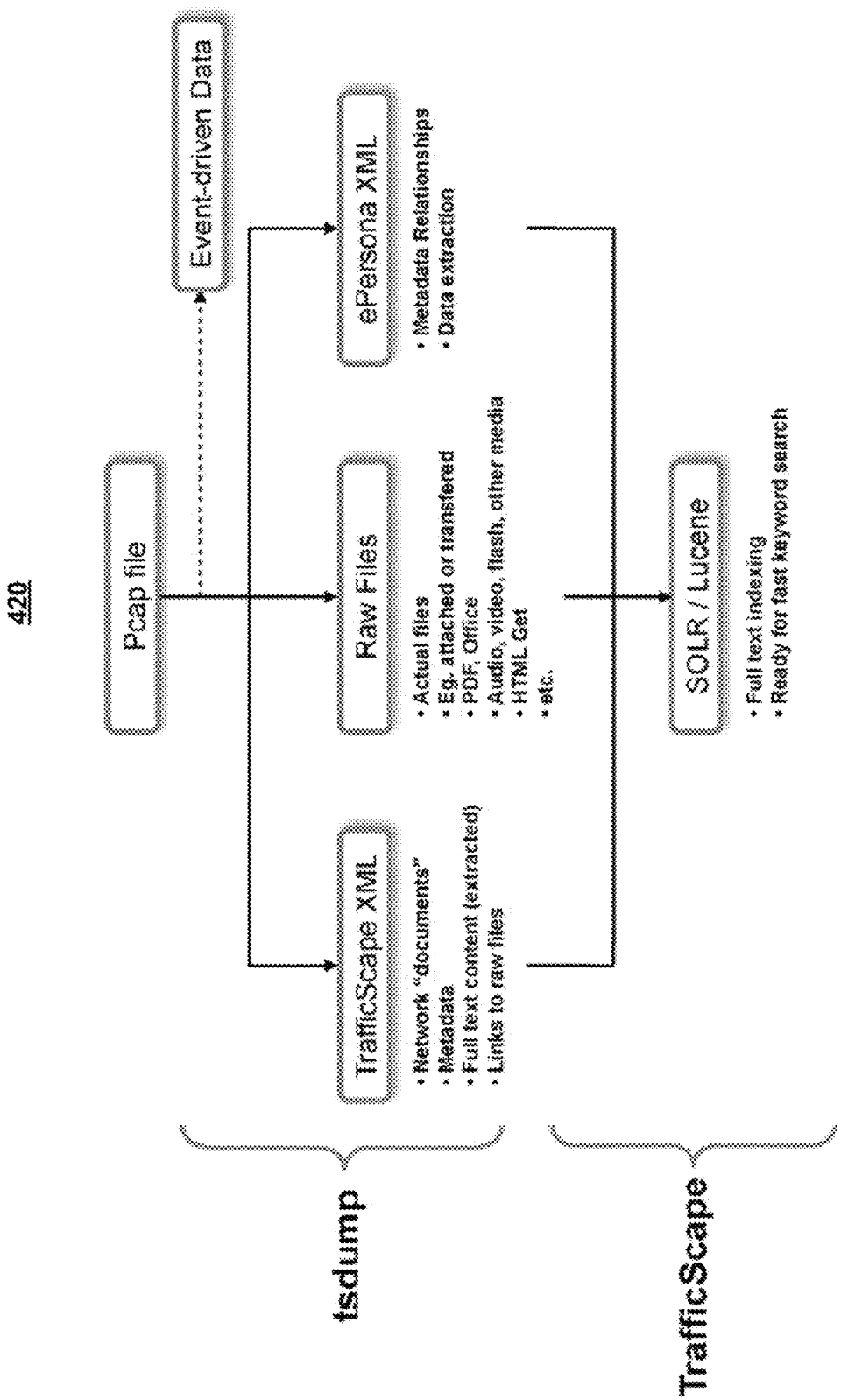
FIG. 14 is a schematic flow diagram illustrating data conversion aspects in accordance with a further practice of the invention.

FIG. 14 is a schematic flow diagram 420 showing data conversion aspects in accordance with a further practice of the invention.

In FIG. 14, data captured in a Pcap file is processed in two phases: a first phase in which tsdump is used to create the following entities:

TrafficScape XML: These include network "documents," metadata, extracted full-text content, links to raw files.

Raw Files: These include actual files, e.g., attached or transferred PDF, Office, audio, video, Flash, other media, HTML GET, etc.

ePersona XML: These include metadata relationships and data extraction, as described above.

In addition, tsdump generates event-driven data.

As further shown in FIG. 14, the entities created by tsdump are then provided to a SOLR/Lucene search engine, which includes full-text indexing, whereby the network data are ready for fast keyword search.

3.3 XML Representation

According to a practice of the invention, Rich XML (eXtensible Markup Language) is used to describe documents after network traffic captured in Pcap files has been decompiled and decomposed, as described above. An example of XML output in accordance with the invention is set forth in FIGS. 6A-6D.

As described above, an XML-based document-oriented database of network traffic is constructed. The XML documents can include metadata extracted from the network traffic, such as session time and duration, email server type, user agent web browser identification, protocol type, username, password, email subject line, and the like.

Another aspect of the invention encompasses identifying a subset of network metadata, closely associated with human users of the network, that reveals how individual people (human network users) expose their activities on the network. (The term "ePersona" is used by the assignee of this application for patent in conjunction with this form of metadata.) This form or category of metadata can include one or more of the following: email address, IP Address, URL, name, postal address, phone numbers, IM chat "handles," website domain names, and the like. These types of metadata are utilized in one aspect of the invention as building blocks for identity resolution, more particularly the process of identifying individual human users of the network, especially when those individuals try to disguise their actions.

The XML produced by the invention reduces the data size of the original packet-level network traffic, normally represented as a Pcap file as discussed above, by a factor of at least 5:1 to 20:1.

The XML retains all relevant forensic details of the original capture. Network technical and security information is retained within the XML metadata, and can be exposed as needed by technical users, while being hidden from casual users. The original Pcap files and data can be recreated from the XML on demand as needed, for example, when a user wishes to examine the data using a traditional network forensic tool.

The resulting representation is highly readable, particularly in comparison to the relatively opaque form of the original binary packet data. The XML format can be optimized for open data interchange with third party software and systems, to enable such software and systems to further process and analyze this data as desired.

In addition to these aspects, in accordance with further practices of the invention, this document-oriented XML network document database can be augmented for search combined with non-network data. The non-network data can comprise any of the following: data recovered from network data storage devices, network security device log files, external "data-at-rest" database files, other data files recovered via computer forensic methods from disks or mobile phones, information from paper documents that have been scanned and processed, and otherwise compiled, using optical character recognition (OCR), and open source information.

The following are some examples of these aspects:

(1) Firewall Logs: Activity log files from network security devices can be searched in combination with actual network traffic. In this way, searching for an IP Address will show what IP traffic was denied at the firewall PLUS what IP traffic was allowed to enter from the same IP Address.

(2) Federated Search: Users of the practices of the invention who wish to search for information about individuals can make a single query that will check both the security databases and captured network traffic.

(3) Open Source Intelligence: The XML search engine data can be further enhanced by searching the internet for open and available information related to data extracted from network traffic.

As mentioned above, in the described practice of the invention, XML is an intermediate format intended for applications which need access to the data. Thus, the XML step can be bypassed in a practice of the described system, which increases performance by storing data directly into the search engine.

3.4 Attribute/Content Indexer; Search Engine

Figure 15:
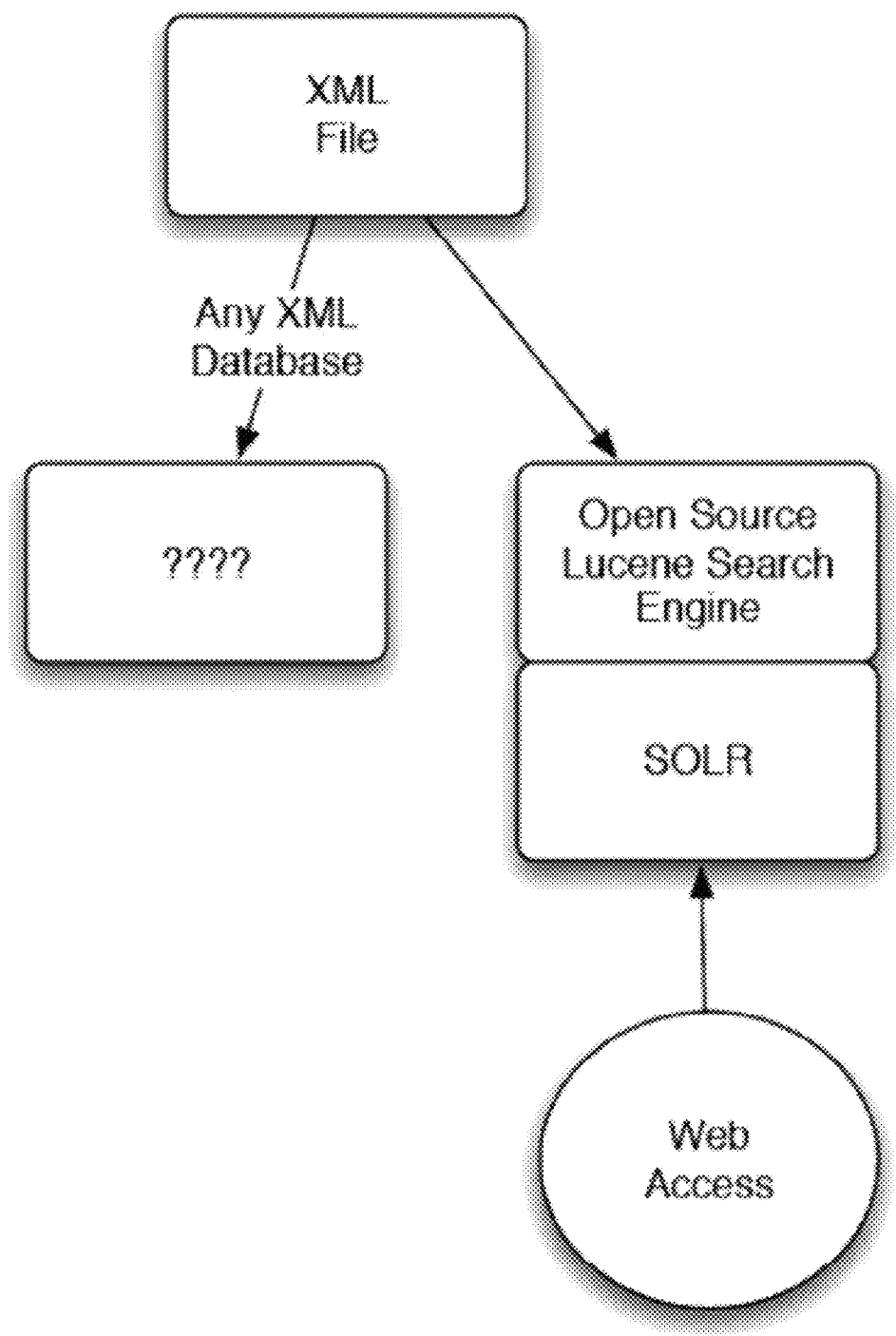
FIG. 15 is a schematic flow diagram illustrating the feeding of an XML representation into an importer layer for either a search engine or an optional external database, or both.

FIG. 15 is a schematic flow diagram 440 illustrating the feeding of an XML representation into an importer layer for either a search engine or an optional external database, or both. In addition, the XML representation can also be fed into another search engine. According to a practice of the invention, the database and search engine functionality are implemented using a plurality of traffic-inspection modules that decompose network traffic.

As mentioned above, the search engine may be a Lucene-based or Solr-based search engine. Solr is an open source enterprise search server based on the Lucene Java search library. See, e.g., www.lucene.apache.org/solr. More particularly, Lucene can be characterized as an open source, document-oriented engine that imports "documents" or document-like entities, indexes the contents, and enables flexible, user-friendly searches like those familiar to users of Google and other conventional search engines.

In turn, the Solr module can be characterized as an additional module that allows the creation of metatags that can be indexed along with the documents. This can be particularly useful for working with or identifying document-specific information such as author, last modified, and the like. In one practice of the invention, the metatags are used to attach session-specific network information to the messages, which enables searches based on network attributes or other information, in addition to searching by content. Both network information and session content are indexed in the database, to enable searching based upon any or both of network information and session content. Thus, metadata searches of network information may be conducted, as well as full-text searches of session content.

It will be understood that in accordance with a practice of the invention, the Solr module is configured to enable correct and accurate searches using network attributes. For example, a single session may belong to multiple "documents." It will also be understood that the Lucene engine can be configured, in accordance with a practice of the invention, to be enabled to import an unlimited number XML files that represent network traffic.

The described systems and processes provide full textual search of network information. The searching capability of these systems and processes is not restricted to network metadata or "network information." Other systems provide indexing, but these systems typically require a user to identify in advance which keywords are important enough to be indexed. The presently described systems and processes provide complete indexing, which provides a user with the capability of discovering new keywords of importance later on. Thus, the presently described systems and processes employ a search engine rather than a database, providing full-text keyword searching from large scale data sets. In addition, as discussed below, the described systems and process provide techniques for using the search engine in the storage and retrieval of ePersona data relationships.

3.41 Other Databases

Also as shown in FIG. 15, the XML data can be transmitted to any database capable of using XML defined data. In particular, one practice of the invention can employ a Markup Language (ML) file that can be exploited to enable the importation of the data to any database that understands XML defined data.

3.5 User Interface

According to a further practice of the invention, the system is embodied in a form that offers a simple and relatively familiar search engine user interface, such that no user training is required, and such that the system can be utilized by substantially anyone within a user organization. In a typical practice of the invention, both networking attributes and session contents can be indexed, thereby enabling comprehensive searches. For example, in one practice of the invention, the following search:

janybody@acme.com payroll 102308.sql FF:7B:9H:GH:45:BD:44:01 would return all network sessions that contained the email address with "payroll" anywhere in the conversation with an attached file of "102308.sql" and an endpoint with a MAC address of FF:7B:9H:GH:45:BD:44:01.

Various practices of the invention can utilize a Web-based interface that is free form, and that allows searching of both content and/or network attributes. In addition, the Web-based interface can make use of toolbars, deskbars, sidebars, and the like.

By way of example, FIG. 4, discussed above, shows an example of search results according to an aspect of the invention, based on use of the Boolean search query "DejavuNOT rmerz." It will be seen that the results, and the corpus of materials across which a search can be executed using practices of the invention, can include any of the following: email messages, IM messages, attachments to messages, and other content.

Figure 16:
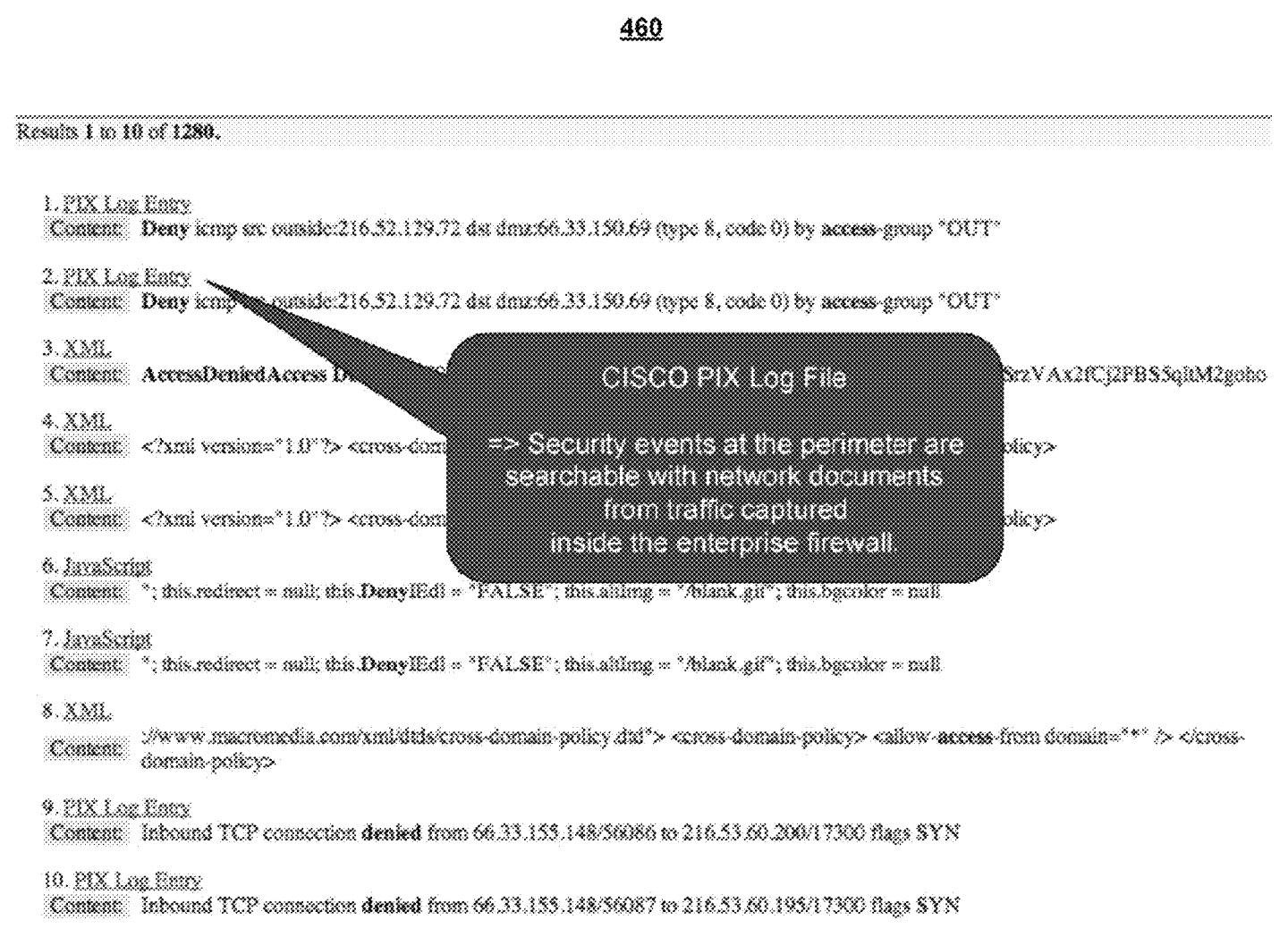

FIG. 16 is a screenshot 460 depicting selected search results available according to an aspect of the invention, showing cross-links with security event information.

Figure 17:
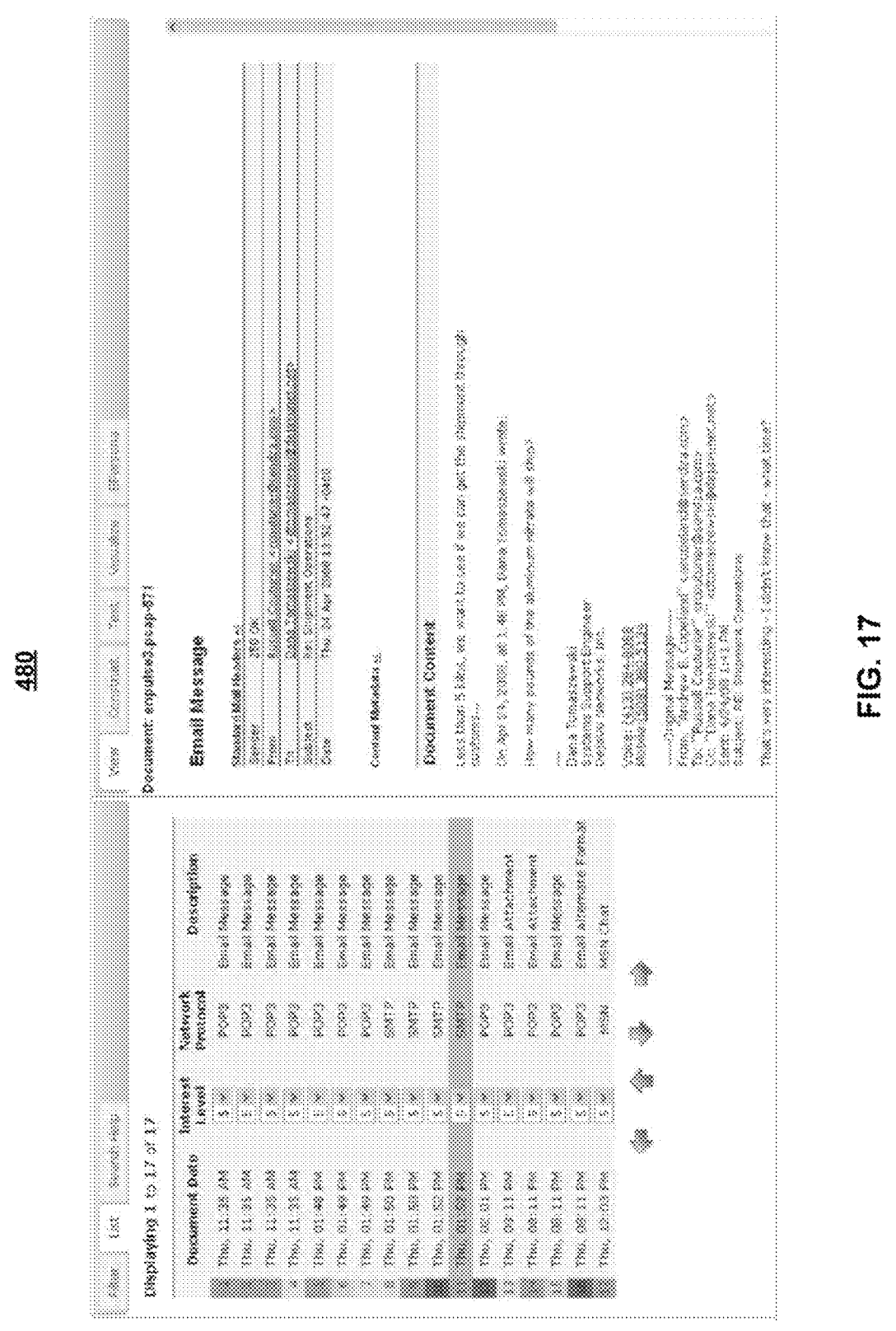

FIG. 17 is a screenshot 480 showing a View Documents and Metadata screen generated in one practice of the invention.

Figure 18:
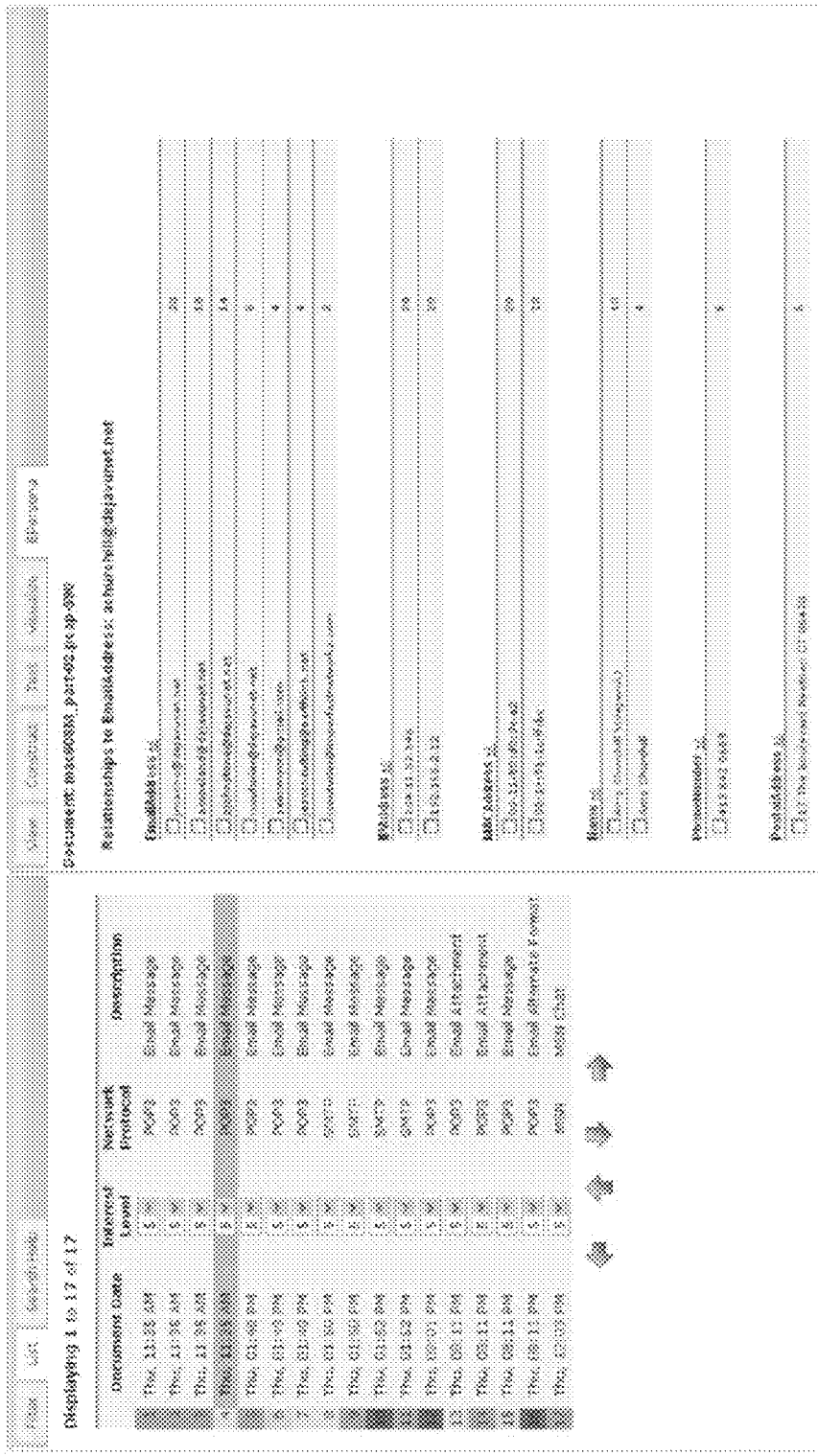
FIG. 18 is a screenshot depicting an example of ePersona data cross-reference made available in one practice of the invention.

FIG. 18 is a screenshot 500 depicting an example of ePersona data cross-reference made available in one practice of the invention.

Figure 19:
FIG. 19 is a screenshot depicting website reconstruction features made available by an aspect of the invention.

FIG. 19 is a screenshot 520 depicting website reconstruction (or "playback") features made available by an aspect of the invention.

Figure 20:
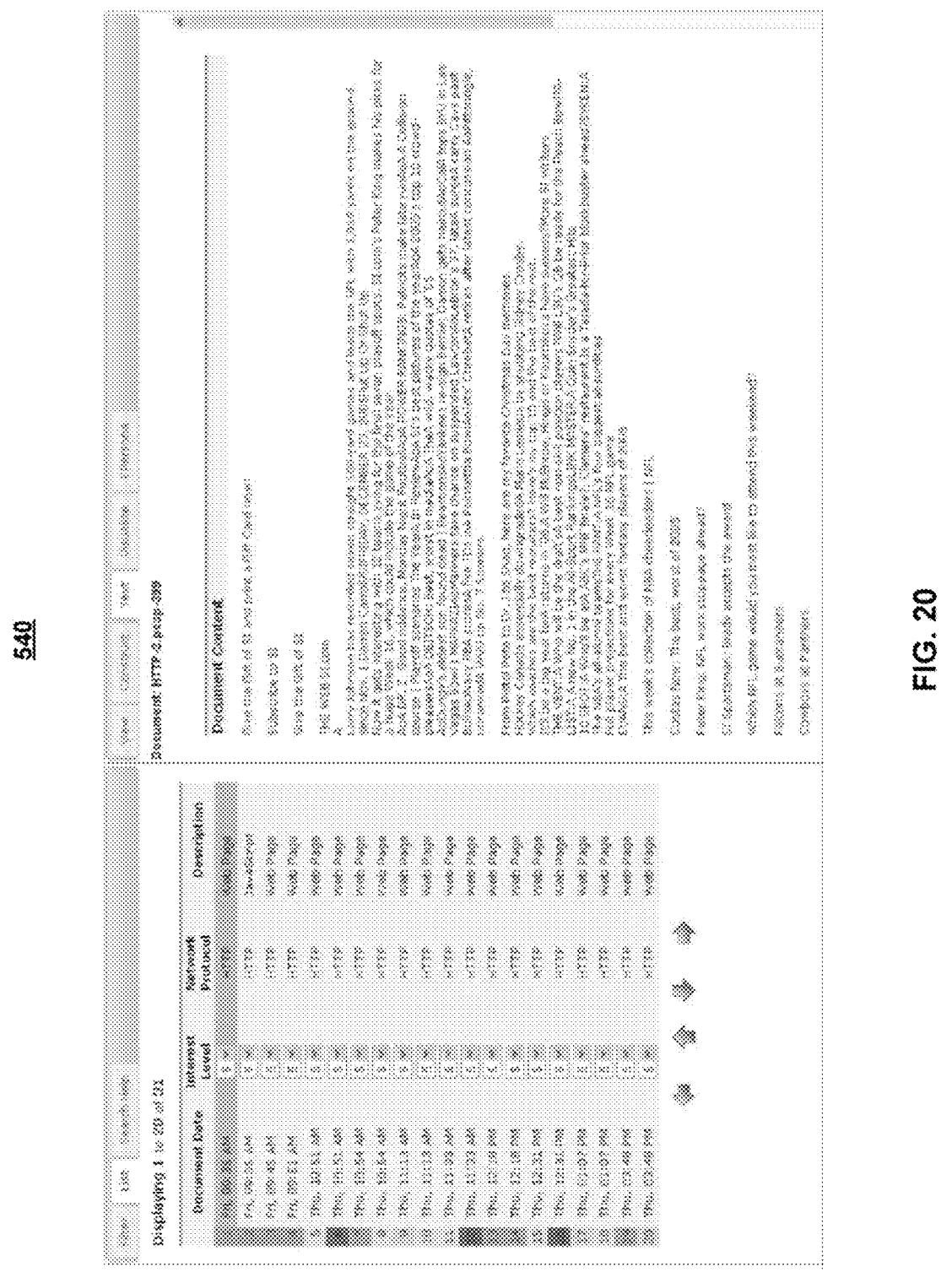

FIG. 20 is a screenshot 540 of website text extraction in accordance with an aspect of the invention.

Figure 21:
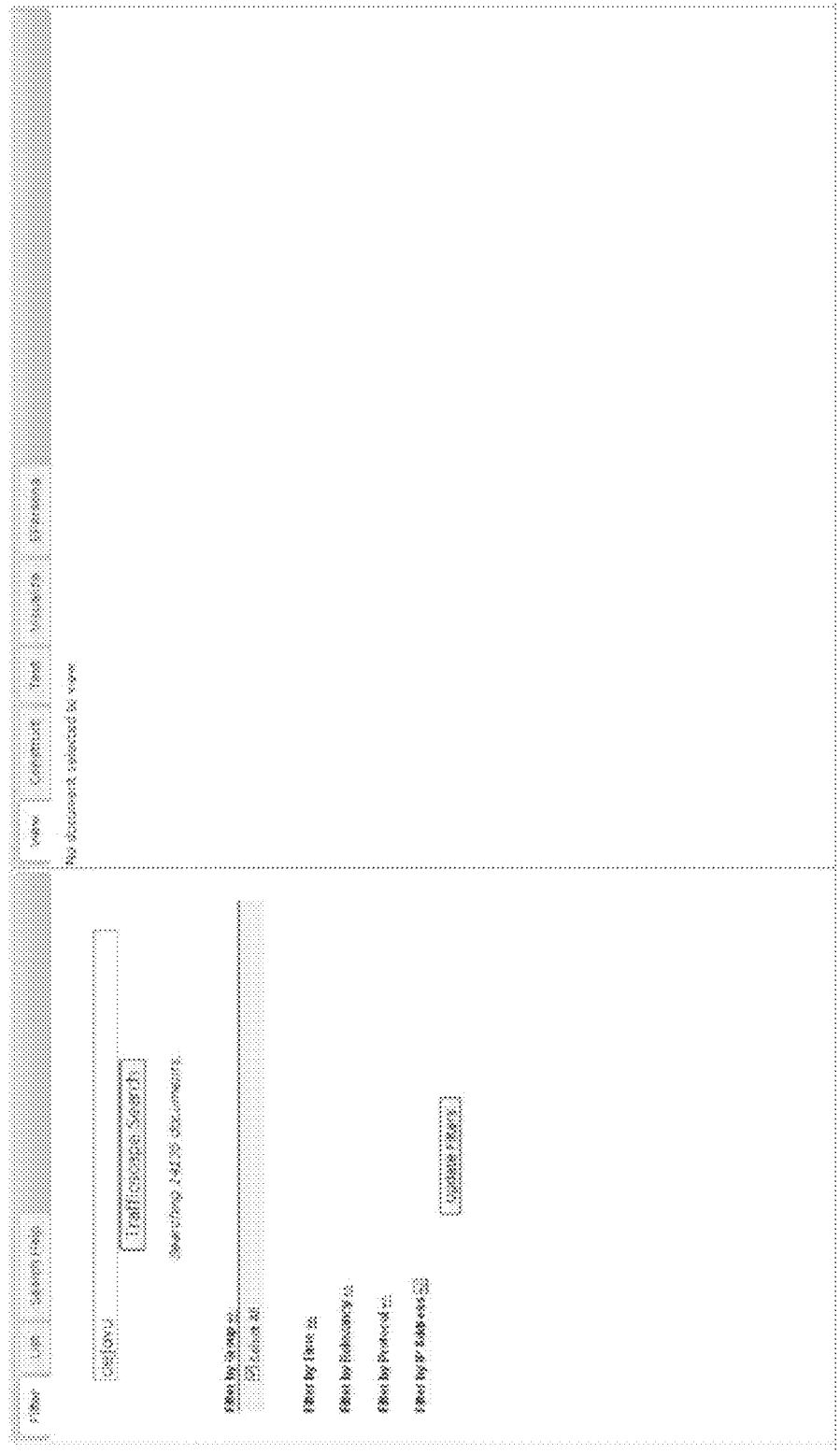
FIG. 21 is a screenshot generated by one practice of the invention, in which a user can set Filter Preferences.

FIG. 21 is a screenshot 560 generated by one practice of the invention, in which a user can set Filter Preferences.

3.6 Architectural Aspects

FIGS. 22-26 are a series of diagrams illustrating architectural aspects of various practices of the invention.

Figure 22:
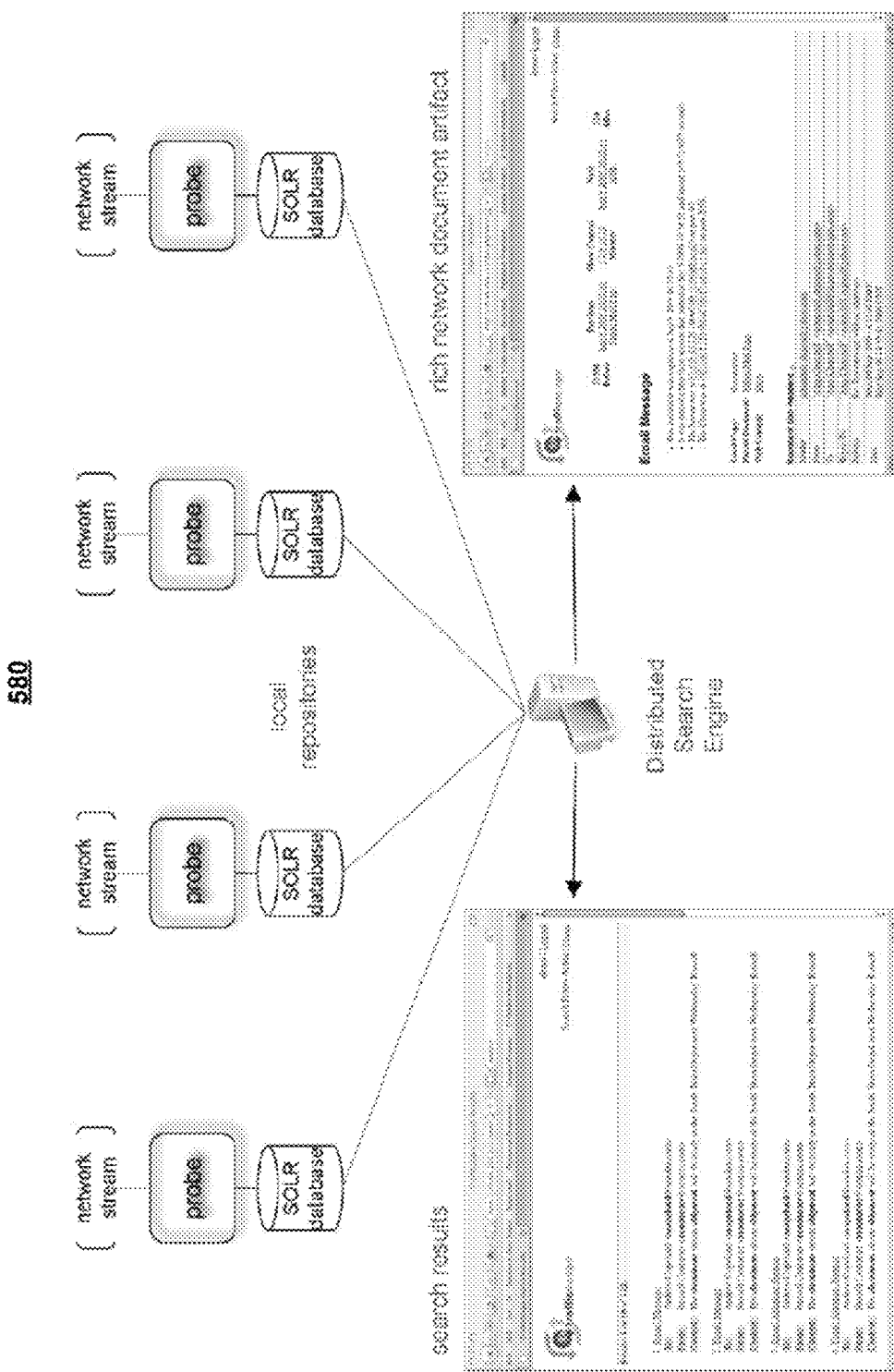
FIGS. 22-26 are a series of diagrams illustrating architectural aspects of various practices of the invention.

FIG. 22 is a diagram 580 illustrating aspects of the distributed architecture of the invention.

Figure 23:
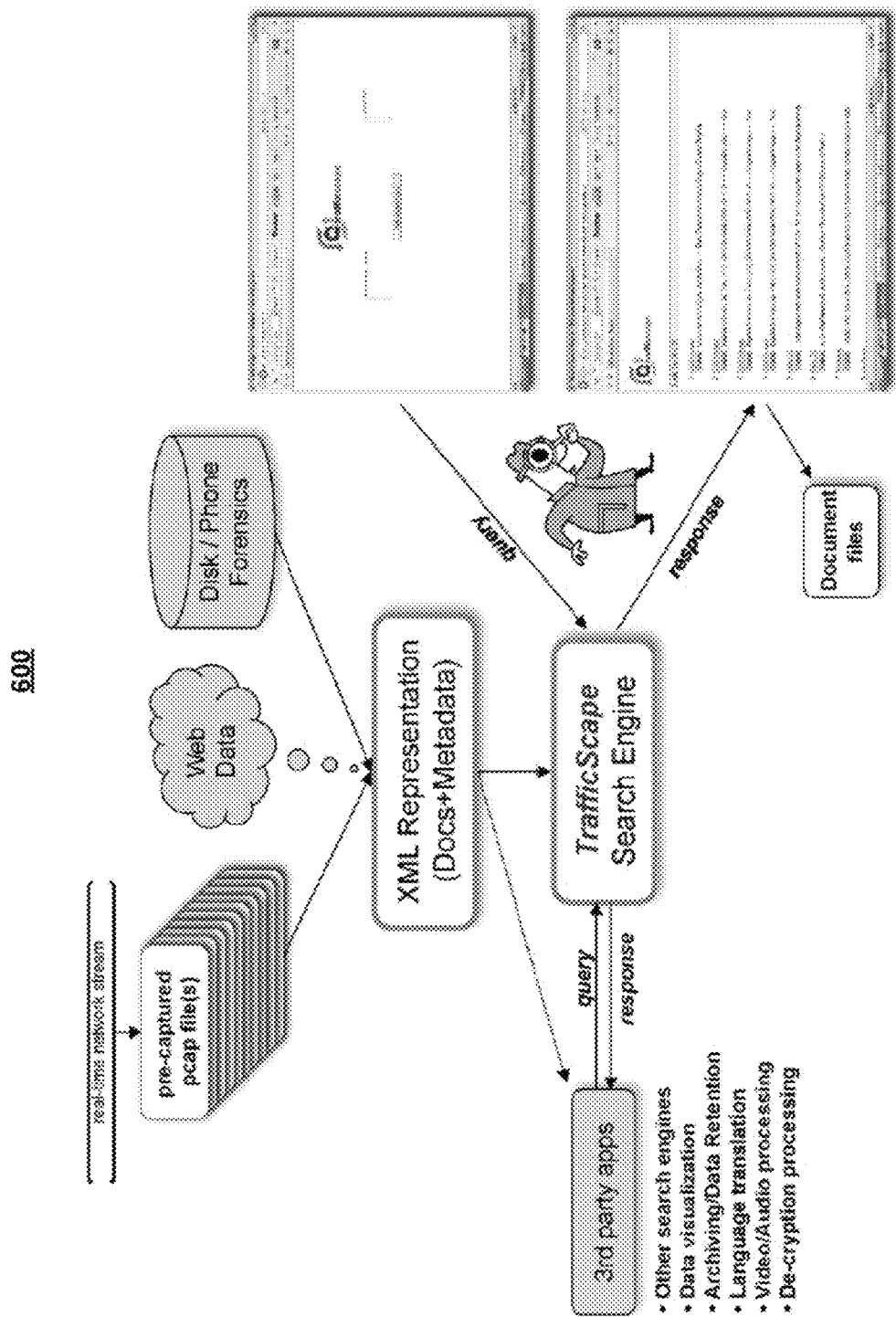

FIG. 23 is a diagram 600 illustrating the open architecture of an exemplary practice of the invention.

Figure 24:
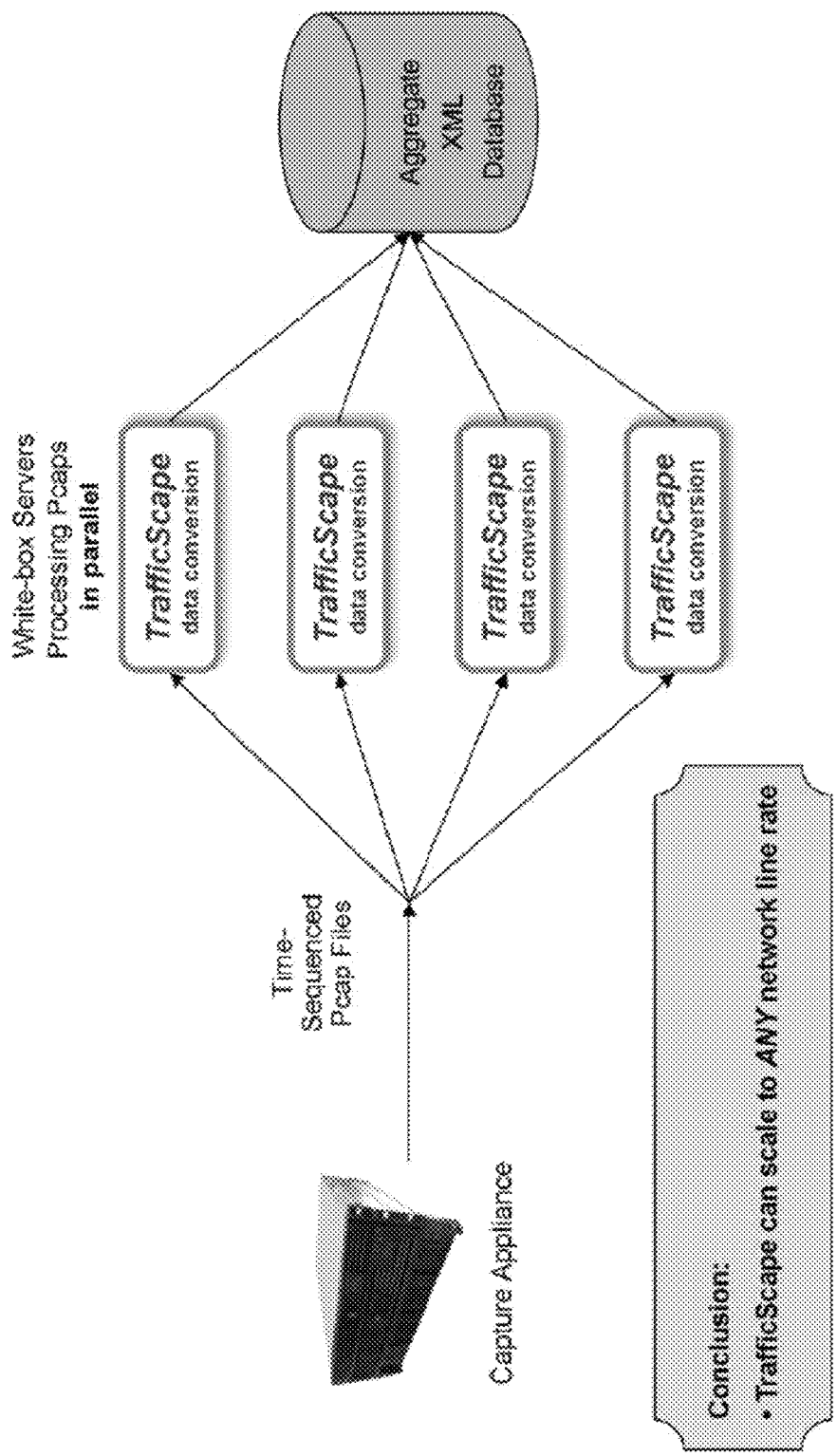
Figure 25:
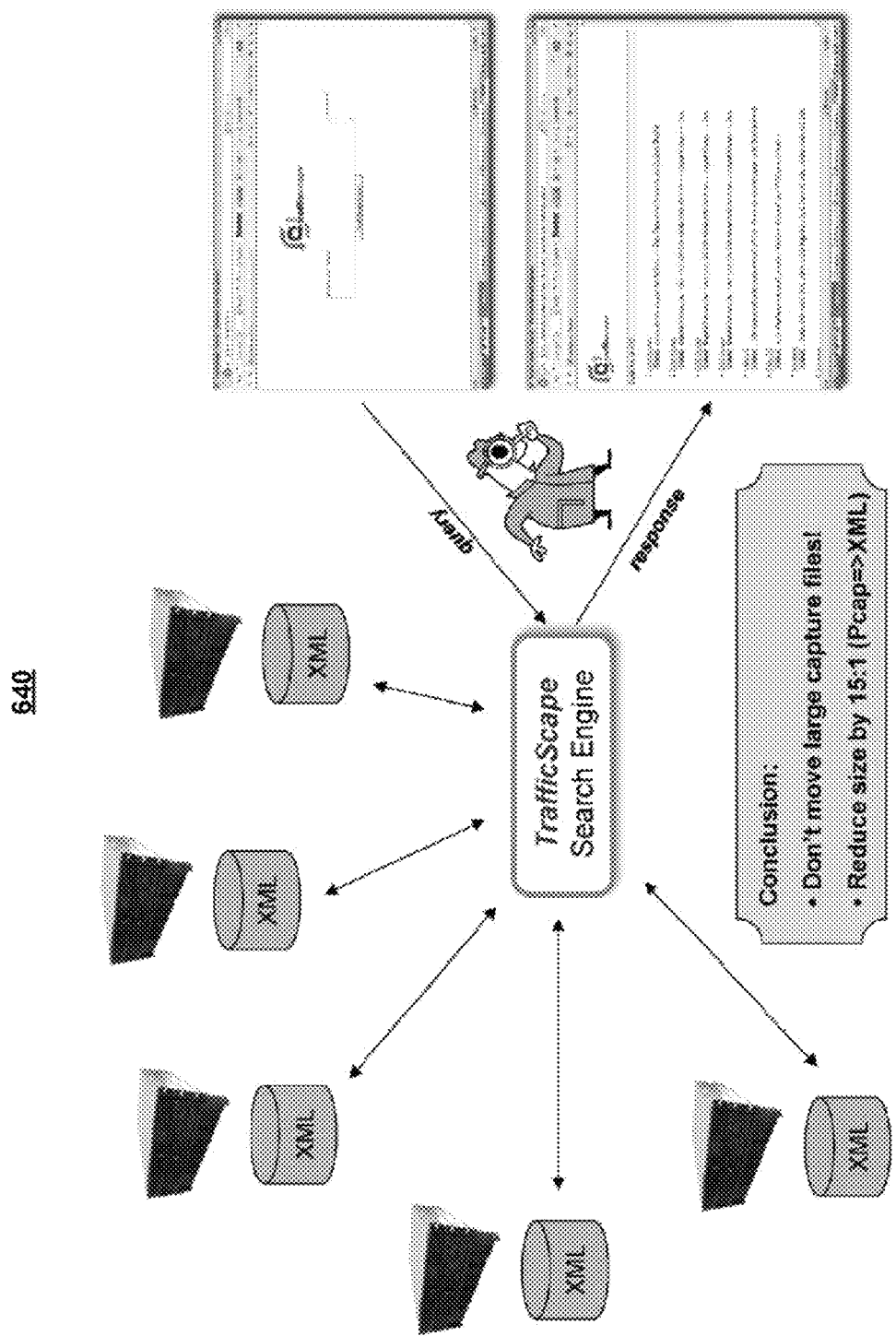
Figure 26:
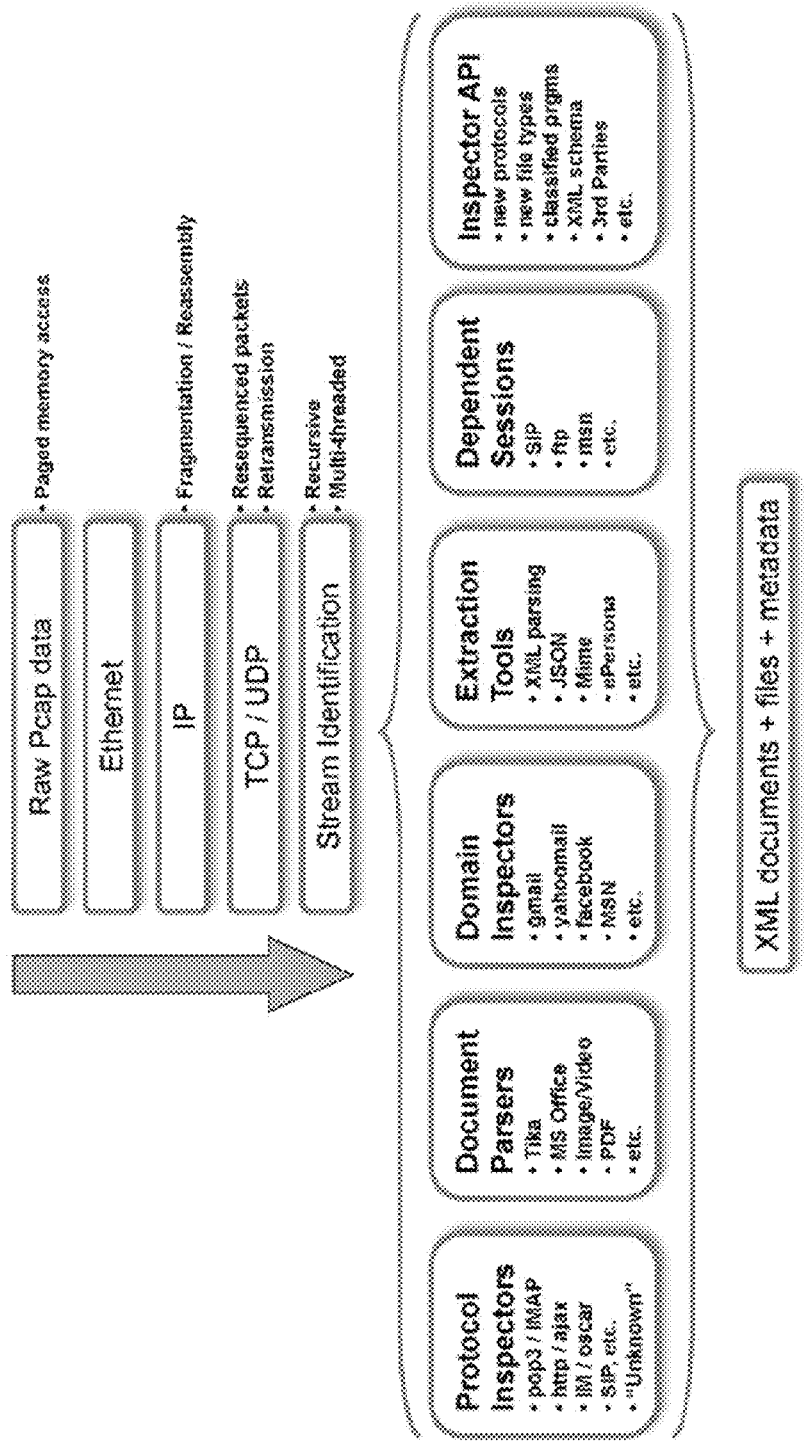

FIG. 24 is a schematic diagram 620 illustrating the continuous processing aspects of the invention; FIG. 25 is a diagram 640 illustrating distributed search features, and FIG. 26 is a diagram illustrating the protocol stack architecture 660 of a practice of the invention (wherein the large arrow indicates a direction of process flow).

4. General Technique According to One Practice of the Invention

Figure 27:
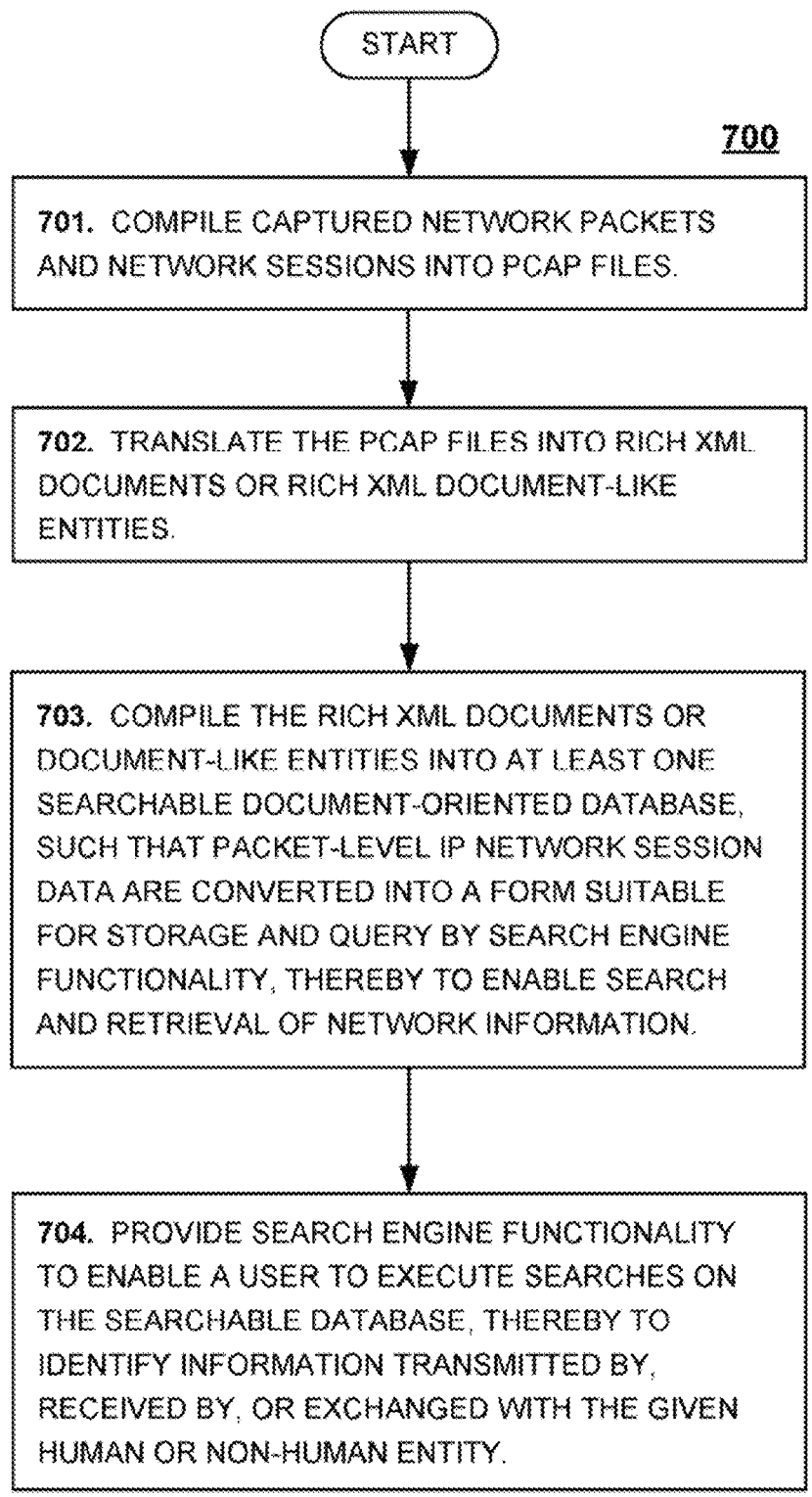
FIG. 27 is a flowchart of a general technique according to aspects of the present invention.

FIG. 27 is a flowchart of a general technique 700 according to a practice of the present invention for enabling searches of digital communications network traffic to identify information transmitted by, received by, or exchanged with a given human or non-human entity.

The technique includes the following:

Box 701: Compile captured network packets and network sessions into Pcap files.

Box 702: Translate the Pcap files into rich XML documents or rich XML document-like entities.

Box 703: Compiling the rich XML documents or document-like entities into at least one searchable document-oriented database, such that packet-level IP network session data are converted into a form suitable for storage and query by search engine functionality, thereby to enable search and retrieval of network information.

Box 704: Provide search engine functionality to enable a user to execute searches on the searchable database, thereby to identify information transmitted by, received by, or exchanged with the given human or non-human entity.

5. Functional Summary and Technical Advantages of Invention

Thus, as shown in the drawings, practices of the present invention can process real-time, dynamic data "in motion" (for example, network traffic), convert it to data "at rest" (e.g., documents), and apply, to the documents, metatags that are associated with the network session information. Practices of the invention can thus take "snapshots" of network traffic, which resemble documents, and can be processed like documents.

Practices of the present invention thus provide a number of technical advantages and improvements over the prior art. Among other aspects, practices of the invention can convert "data-in-motion," including network traffic, emails, instant messages (IMs), VoIP communications, and Web activities, into documents. Practices of the invention enable the decomposition of network sessions and content, enabling either or both of full text searches and session attribute searches. Full text searching can include content, documents, voice, images, and other files. Session attribute searching can include network protocols, IP and MAC addresses, ports, headers, and other attributes. In one practice, the invention can utilize a Solr-based search engine; alternatively, a practice of the invention can enable importing to other document-based search engines.

Practices of the invention can be adapted for use by the network traffic capture industry, whether in connection with appliance-based or NIC (network interface card) technologies, and with either or both line rate capture and/or massive storage. Practices of the invention can also be used in connection with QOS (quality of service) provider environments, such as real-time packet inspection/analysis. Still further, practices of the invention have applications in the lawful intercept arena, in settings where "wiretapping" of network traffic is deemed lawful. Other potential applications include business intelligence, and e-forensics/e-discovery, which can comprise inspection of communications protocols, email or IM archives, files, or other data at rest.

As discussed above, practices of the invention enable free-form searches for various forms of network traffic, and are capable of decomposing all network traffic into searchable documents, searchable network attributes (IP and MAC address, port numbers, protocol headers and attributes), and/ or social networks (email threads, IM buddies, MAC and IP addresses). In a searchable document practice of the invention, the system is capable of decomposing all network session attributes, whether relating to attachments, images, Web pages, voice files, or other files, and can allow searching of Web-based conversations as documents.

Practices of the invention enable non-technical users to search across complex network traffic and effectively generate useful results.

Social Networks: Practices of the present invention also enable the ability to relate social networks as part of the search criteria. Social networks can encompass any related conversations between two individuals or a group of related individuals. In accordance with a practice of the present invention, social networks are identified and displayed as part of the resultant search set. This information can be highly valuable when a user is attempting to identify documents or information that were or are commonly shared among a group of individuals. Among other examples, these aspects of the present invention can be useful in identifying the following relationships or social network indicia:

Email threads
Instant message chat buddies
Common web servers visited
Common VoIP phone calls
Common IP addresses
Common FTP sites
Social network shares Search Independence: Practices of the invention also provide search independence. Using a search engine in the manner described above (see, for example, the system diagram shown in FIG. 2, discussed above), such as a Solr-based search engine, practices of the invention enable Pcap-to-XML decompilation, can decompose content, network attributes or objects, and can import to any database that is XML-aware.

Packaging: In various practices, the invention can be "packaged" in a number of ways, including as a complete solution (such as an archiving appliance with a search engine) that enables both capture and conversion to databases for searching; or as a hosted solution, in which the customer gives the service provider an archive of network traffic in the form of Pcap files, and the service provider executes the conversion and offers secure Web access; or a setting in which the customer imports/licenses Pcap files to a third-party search engine, database or XML decompiler.

In summary, practices of the invention offers the following key functional aspects:

Simple familiar search interface requiring no user training.
Convergence of network genetics and session content.
Ability to operate with multiple network archive formats including Pcap and snoop.
Ability to identify a social network of any searched data set.
Can be optimized for very large repositories.
Can merge separate repositories into a single database and query.
Enables metadata searches of network attributes.
Enables full text searches on session content.
Allows deployment of large numbers of traffic inspectors that decompose network traffic.
Enables the identification/unraveling of all documents associated with a network session.
Provide the solutions as an appliance or hosted service.

6. Digital Processing Environment in which Invention can be Implemented

Figure 28:
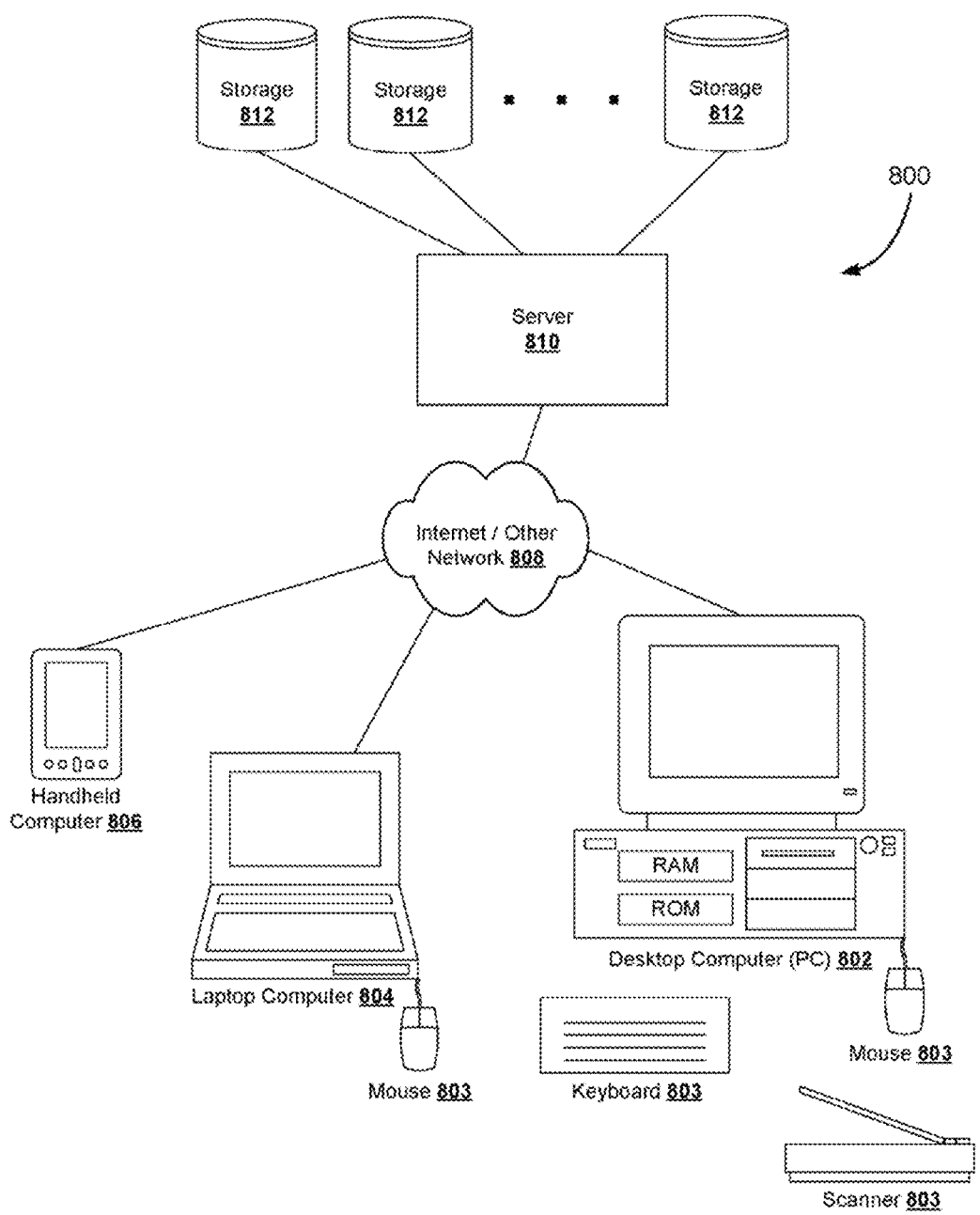
FIG. 28 and FIG. 29 are diagrams illustrating various digital processing environments in which aspects of the present invention may be implemented and practiced.
Figure 29:
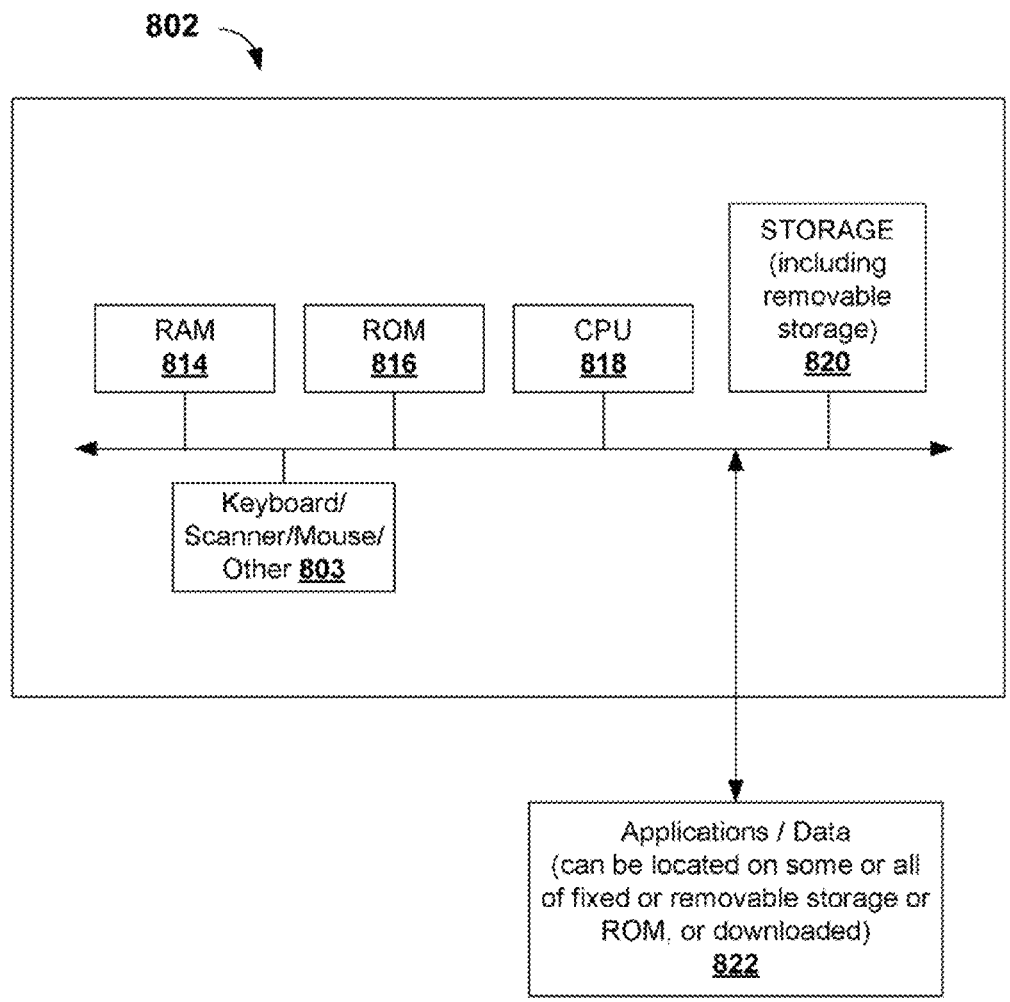

The following discussion, in connection with FIG. 28 (Prior Art network architecture) and FIG. 29 (Prior Art PC or workstation architecture), describes various digital processing environments in which aspects of the present invention may be implemented and practiced, typically using conventional computer hardware elements.

The discussion set forth above in connection with FIGS. 1-27 described methods, structures, systems, and software products in accordance with the invention. It will be understood by those skilled in the art that the described methods and systems can be implemented in software, hardware, or a combination of software and hardware, using conventional computer apparatus such as a personal computer (PC) or equivalent device operating in accordance with (or emulating) a conventional operating system such as Microsoft Windows, Linux, or Unix, either in a standalone configuration or across a network. The various processing aspects and means described herein may therefore be implemented in the software and/or hardware elements of a properly configured digital processing device or network of devices. Processing may be performed sequentially or in parallel, and may be implemented using special purpose or re-configurable hardware.

As an example, FIG. 28 attached hereto depicts an illustrative digital processing network 800 in which practices of the invention can be implemented. Alternatively, aspects of the invention can be practiced in a wide range of computing environments and digital processing architectures, whether standalone, networked, portable or fixed, including conventional PCs 802, laptops 804, handheld or mobile computers 806, or across the Internet or other networks 808, which may in turn include servers 810 and storage 812, as shown in FIG. 28.

As is well known in conventional computer software and hardware practice, a software application configured in accordance with the practices of the invention can operate within, e.g., a PC or workstation 802 like that depicted schematically in FIG. 29, in which program instructions can be read from CD ROM 816, magnetic disk or other storage 820 and loaded into RAM 814 for execution by CPU 818. Applications and/or data 822 can be input into the system via any known device or means, including a conventional keyboard, scanner, mouse or other elements 803.

Those skilled in the art will understand that various method aspects of the invention described herein can also be executed in hardware elements, such as an Application-Specific Integrated Circuit (ASIC) constructed specifically to carry out the processes described herein, using ASIC construction techniques known to ASIC manufacturers. Various forms of ASICs are available from many manufacturers, although currently available ASICs do not provide the functions described in this patent application. Such manufacturers include Intel Corporation of Santa Clara, Calif. The actual semiconductor elements of such ASICs and equivalent integrated circuits are not part of the present invention, and are not be discussed in detail herein.

Those skilled in the art will also understand that method aspects of the present invention can be carried out within commercially available digital processing systems, such as workstations and PCs as depicted in FIG. 29, operating under the collective command of the workstation or PC's operating system and a computer program product configured in accordance with practices of the present invention. The term "computer program product" can encompass any set of computer-readable programs instructions encoded on a non-transitory computer readable medium. A computer readable medium can encompass any form of computer readable element, including, but not limited to, a computer hard disk, computer floppy disk, computer-readable flash drive, computer-readable RAM or ROM element or any other known means of encoding, storing or providing digital information, whether local to or remote from the workstation, PC or other digital processing device or system. Various forms of computer readable elements and media are well known in the computing arts, and their selection is left to the implementer.

7. Conclusion

While the foregoing description and the accompanying drawing figures provide details which will enable those skilled in the art to practice aspects of the invention, it should be recognized that the description is illustrative in nature and that many modifications and variations thereof will be apparent to those skilled in the art having the benefit of these teachings. It is accordingly intended that the invention herein be defined solely by any claims that may be appended hereto and that the invention be interpreted as broadly as permitted by the prior art.

We claim:

1. A method for enabling a search of digital communications network traffic to identify information transmitted by, received by, or exchanged with a given human or non-human entity via the digital communications network, the method comprising:

translating Pcap (packet capture) files or streams of IP network packets obtained from the network into a scalable form suitable for query by search engine functionality, thereby to enable scalable, text-based search of network information contained in the Pcap files, and providing scalable search engine functionality to enable a user to execute a text-based search on textual or human relationship-identifying information derived from the Pcap files or streams of IP network packets, thereby to identify information transmitted by, received by, or exchanged with the given human or non-human entity, wherein the scalable search engine functionality is capable of scaling to search massive quantities of Pcap files or IP network packet data.

2. A method for enabling searches of digital communications network traffic to identify selected human users of the network, and to identify social networks of human users of the network, the method comprising:

translating Pcap (packet capture) files or streams of IP network packets obtained from the network into a scalable form suitable for query by search engine functionality, thereby to enable scalable, text-based search of network information contained in the Pcap files or streams of IP network packets, the Pcap files or streams of IP network packets comprising metadata extracted from network traffic, wherein the metadata comprise elements identifying selected human users of the network, providing scalable search engine functionality to enable a user to execute text-based searches on textual or human relationship-identifying information derived from the Pcap files or streams of IP network packets, correlating, via the scalable search engine functionality, selected metadata to identify human users of the network, wherein the metadata comprises identifying elements that enable the search engine functionality to correlate information that identifies human users of the network, and identifying, via the scalable search engine functionality, relationships between human users of the network, or social networks or portions of social networks, by correlating the identifies of first human users of the network and second human users that communicate with the first human users of the network, wherein the identifying enables rapid recall or identification of relationships between human users of the network, or social networks or portions of social networks, from massive quantities of Pcap files or IP network packet data, thereby to identify human users of the network, and identify social networks of human users of the network.

3. A method for enabling searches of digital communications network traffic to identify information transmitted by, received by, or exchanged with a given human or non-human entity via the digital communications network, the method comprising:

translating Pcap (packet capture) files or streams of IP network packets obtained from the network into rich XML (extensible markup language) documents or rich XML document-like entities, and compiling the rich XML documents or document-like entities into at least one scalable, searchable, document-oriented database, such that packet-level IP network session data are converted into a scalable form suitable for text-based query by search engine functionality, thereby to enable scalable, text-based search and retrieval of network information, and providing scalable search engine functionality to enable a user to execute text-based searches on textual or human relationship-identifying information in the searchable database, thereby to identify information transmitted by, received by, or exchanged with the 25 given human or non-human entity.

4. The method of claim 3 wherein at least a subset of searches are enabled via content-based text indexing.

5. The method of claim 3 further wherein the Pcap files comprise IP session messages, transactions and protocol sequences.

6. The method of claim 3 further wherein the rich XML documents or rich XML document-like entities comprise metadata extracted from network traffic, wherein the metadata comprise any of session time and duration, email server type, user agent web browser identification, protocol type, username, password, and email subject line.

7. The method of claim 3 further comprising:

utilizing a Pcap decompiler that creates indexes for network session attributes, message contents and object contents, and generating a Pcap decompiler output comprising an XML file representative of sessions, messages, object attachments and indexes, and further comprising:

utilizing selected tap points in the network to capture information, wherein the tap points can include any of communications switches, servers, client devices, VOIP devices.

8. The method of claim 3 wherein the search engine functionality enables creation of metatags to be indexed in association with corresponding rich XML documents or rich XML document-like entities, the metatags incorporating session-specific network information, thereby to enable searching of the database based on network information.

9. The method of claim 8 wherein both network information and session content are indexed in the database, to enable searching based upon any or both of network information and session content.

10. The method of claim 9 further comprising executing metadata searches of network information.

11. The method of claim 10 further comprising executing full text searches of session content.

12. The method of claim 6 further comprising identifying a subset of network metadata that enables identification of activity of at least one human user of the digital communications network.

13. The method of claim 12 wherein the subset of network metadata comprises any of email address, IP address, MAC address, name, postal address, telephone numbers, VOIP numbers, IM chat "handles", social network site identifiers, website domain names, and Personally Identifiable Information (PII), wherein the PII comprises any of social security numbers or credit card numbers.

14. The method of claim 13 wherein the subset of network metadata is utilized for identity resolution, wherein identity resolution comprises identifying specific, individual human users of the network.

15. The method of claim 14 further comprising constructing a database of social network links, utilizing the subset of network metadata.

16. The method of claim 15 wherein the database of social network links comprises identification of contacts, which comprise human individuals or other entities with whom a human or non-human entity under investigation communicates, and contacts of contacts, which comprise human or non-human entities with whom the contacts of the entity under investigation communicate.

17. The method of claim 16 wherein the database is utilized to identify links between network users even if the network users utilize different identifiers to communicate with different contacts.

18. The method of claim 3 wherein the search engine functionality is used to identify associations between data elements in the database.

19. The method of claim 3 wherein network documents can be retrieved by searching based on selected keywords, and wherein the keywords can be used to search across any of text content and meta-data terms.

20. The method of claim 3 wherein the rich XML retains forensic details of an original capture, and wherein data represented by original Pcap files can be recreated from the XML on demand.

21. The method of claim 3 wherein the database is configured for searching by either or both of network data and non-network data.

22. The method of claim 21 wherein the non-network data comprise any of network security device log files, external data-at-rest database files, data recovered from data storage devices or mobile telephones, data electronically compiled from paper documents, and open source information.

23. The method of claim 17 wherein the rich XML documents or rich XML document-like entities, and the meta-data, are further utilized to generate a graphical display of social network diagrams.

24. The method of claim 3 further comprising deriving any of textual information, audio/visual media, or other information from any of email and document attachments, instant messaging transcripts, websites viewed, social networking sites and related transcripts, audio and VOIP calls, relational database accesses, and remote access by users to CPUs and file servers.

25. The method of claim 17 further comprising correlating any of human identities, inter-human relationships, conversations and network metadata, computers, physical locations, electronic locations, internet IDs, cellular IDs, and computers, in response to keyword searches by a human user of the search engine functionality.

26. The method of claim 3 further comprising:
decompiling at least one stream of digital network traffic data, the digital stream de-compilation being applicable to any of POP3, SMTP, or IMAP streams, web mail, social networks, and blog streams, VOIP, HTTP, and CIFS streams, FTP, Oracle and DNS streams, instant messaging and email streams.

27. The method of claim 3 wherein a Pcap file comprises (a) a representation of network traffic for a selected network interface card (NIC) for a selected time period, and (b) session protocol information comprising network attributes.

28. The method of claim 27 further comprising enabling searching of the database based on any of network content, network traffic genetics, metadata or attributes, wherein network traffic genetics comprises any of protocol headers, MAC, IP and port addresses, and attachment metadata.

29. The method of claim 3 further comprising correlating selected search results with one or more social networks of network users.

30. The method of claim 29 wherein social networks are identified by evaluating one or more social network indicators, comprising any of email threads, IM chat "buddies", common web servers visited, common VOIP calls, common IP addresses, common FTP sites, or social network sharing.

31. The method of claim 3 further comprising providing a user interface, wherein the user interface comprises a Web-based interface that enables searching based on any of content or network attributes.

32. The method of claim 3 wherein the database and search engine functionality utilize a secure hosted environment wherein any of archives and Pcap files are imported via encrypted transport protocols.

33. The method of claim 32 wherein the database and search engine functionality are implemented in a networking and storage device located in a user's selected facility.

34. The method of claim 3 wherein the database and search engine functionality are implemented using a plurality of traffic-inspection modules that decompose network traffic.

35. The method of claim 3 further comprising identifying and providing access to a set of documents associated with a network session.

36. A system for enabling a search of digital communications network traffic to identify selected human users of the digital communications network, and to identify social networks of human users of the digital communications network, the system comprising:
means for translating Pcap (packet capture) files or streams of IP network packets obtained from the network into a scalable form suitable for query by a search engine, thereby to enable scalable, text-based search of network information contained in the Pcap files or streams of IP network packets, the Pcap files or streams of IP network packets comprising metadata extracted from network traffic, wherein the metadata comprise elements identifying selected human users of the network,
scalable search engine means for enabling a user to execute a text-based search on textual or human relationship, identifying information derived from the Pcap files or streams of IP network packets,
the search engine means comprising:
(1) means for correlating selected metadata to identify human users of the network, wherein the metadata comprises identifying elements that enable the search engine functionality to correlate information that identifies human users of the network, and (2) means for identifying relationships between human users of the network, or social networks or portions of social networks, by correlating the identifies of first human users of the network and second human users that communicate with the first human users of the network, wherein the identifying enables rapid recall or identification of relationships between human users of the network, or social networks or portions of social networks, from Pcap files or IP network packet data, thereby to identify human users of the network, and identify social networks of human users of the network.

37. A computer program code product, comprising a non-transitory, computer-readable medium storing computer program code executable by a computer to enable the computer to execute a search of digital communications network traffic to identify selected human users of the digital communications network, and to identify social networks of human users of the digital communications network, the computer program code comprising:

first computer program code executable by the computer to enable the computer to translate Pcap (packet capture) files or streams of IP network packets obtained from the network into a scalable form suitable for query by a Search engine, thereby to enable scalable, text-based search of network information contained in the Pcap files or streams of IP network packets, the Pcap files or streams of IP network packets comprising metadata extracted from network traffic, wherein the metadata comprise elements identifying selected human users of the network;

second computer program code executable by the computer to enable the computer to provide a scalable search engine enabling a user to execute a text-based search on textual or human relationship-identifying information derived from the Pcap files or streams of IP network packets, the second computer program code comprising:

(1) computer program code executable by the computer to enable the computer to correlate selected metadata to identify human users of the network, wherein the metadata comprises identifying elements that enable the search engine functionality to correlate information that identifies human users of the network, and (2) computer program code executable by the computer to enable the computer to identify relationships between human users of the network, or social networks or portions of social networks, by correlating identifies of first human users of the network and second human users that communicate with the first human users of the network, wherein the identifying enables rapid recall or identification of relationships between human users of the network, or social networks or portions of social networks, from Pcap files or IP network packet data, thereby to identify human users of the network, and identify social networks of human users of the network.

\* \* \* \* \*

UNITED STATES PATENT AND TRADEMARK OFFICE
CERTIFICATE OF CORRECTION

PATENT NO. : 8,406,141 B1
APPLICATION NO. : 12/778101
DATED : March 26, 2013
INVENTOR(S) : Russell L. Couturier, Patrick V. Johnstone and John H. Ricketson Page 1 of 1

It is certified that error appears in the above-identified patent and that said Letters Patent is hereby corrected as shown below:

In the Claims:

Column 22, line 33 delete "25".

Signed and Sealed this
Twenty-first Day of May, 2013

Teresa Stanek Rea
*Acting Director of the United States Patent and Trademark Office*